US012677029B2

(12) United States Patent
Soto

(10) Patent No.: US 12,677,029 B2
(45) Date of Patent: Jul. 7, 2026

(54) TECHNIQUES FOR PERSONALIZATION MODEL TRANSFER

(71) Applicant: Sonos, Inc., Goleta, CA (US)

(72) Inventor: Kurt T. Soto, Ventura, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/894,379

(22) Filed: Sep. 24, 2024

(65) Prior Publication Data

US 2025/0106470 A1 Mar. 27, 2025

Related U.S. Application Data

(60) Provisional application No. 63/585,624, filed on Sep. 27, 2023.

(51) Int. Cl.
H04N 21/4363 (2011.01)
H04N 21/45 (2011.01)
H04N 21/466 (2011.01)

(52) U.S. Cl.
CPC ... H04N 21/43637 (2013.01); H04N 21/4532 (2013.01); H04N 21/4662 (2013.01)

(58) Field of Classification Search
CPC ......... H04N 21/43637; H04N 21/4532; H04N 21/4662; H04N 21/43615; H04R 27/00;
(Continued)

(56) References Cited

U.S. PATENT DOCUMENTS

| 5,440,644 | A | 8/1995 | Farinelli et al. |
| 5,761,320 | A | 6/1998 | Farinelli et al. |
| | | (Continued) | |

FOREIGN PATENT DOCUMENTS

| EP | 1389853 A1 | 2/2004 |
| WO | 0153994 A2 | 7/2001 |
| | (Continued) | |

OTHER PUBLICATIONS

AudioTron Quick Start Guide, Version 1.0, Mar. 2001, 24 pages.
(Continued)

*Primary Examiner* — Alazar Tilahun
(74) *Attorney, Agent, or Firm* — Secant IP, P.L.L.C.

(57) ABSTRACT

An example method includes collecting, with a network device positioned at a plurality of locations, information indicative of a plurality of patterns of wireless signals between the network device and a plurality of playback devices, and training a first parameterized machine learning model to produce a trained model that identifies playback device(s) proximal to the network device based on feature(s) derived from the information. The method may further include transferring the trained model to a portable playback device, collecting, with the portable playback device, data indicative of a pattern of wireless signals between the portable playback device and the plurality of playback devices, applying the trained model to feature(s) derived from the data to identify at least one playback device of the plurality of playback devices that is proximal to the portable playback device, and communicating a request from the portable playback device to the at least one playback device.

19 Claims, 24 Drawing Sheets

(58) Field of Classification Search

CPC ............... H04R 3/12; H04R 2227/005; H04R 2430/01; G05B 15/02; G06F 3/0482; G06F 3/04842; G06F 3/16; G06F 3/165; H03G 1/02; H03G 7/00; H04H 60/80

See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollström et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2004/0252859 A1 | 12/2004 | Saiki | |
| 2007/0142944 A1 | 6/2007 | Goldberg et al. | |
| 2019/0268666 A1* | 8/2019 | Lee .................. H04N 21/44218 | |
| 2021/0099829 A1* | 4/2021 | Soto ........................ G06F 3/165 | |
| 2022/0191621 A1 | 6/2022 | Scheek | |

FOREIGN PATENT DOCUMENTS

| | | |
|---|---|---|
| WO | 03093950 A2 | 11/2003 |
| WO | 2023215856 A1 | 11/2023 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Searching Authority, International Search Report and Written Opinion mailed on Sep. 26, 2025, issued in connection with International Application No. PCT/US2025/033747, filed on Jun. 16, 2025, 13 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc. v. D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

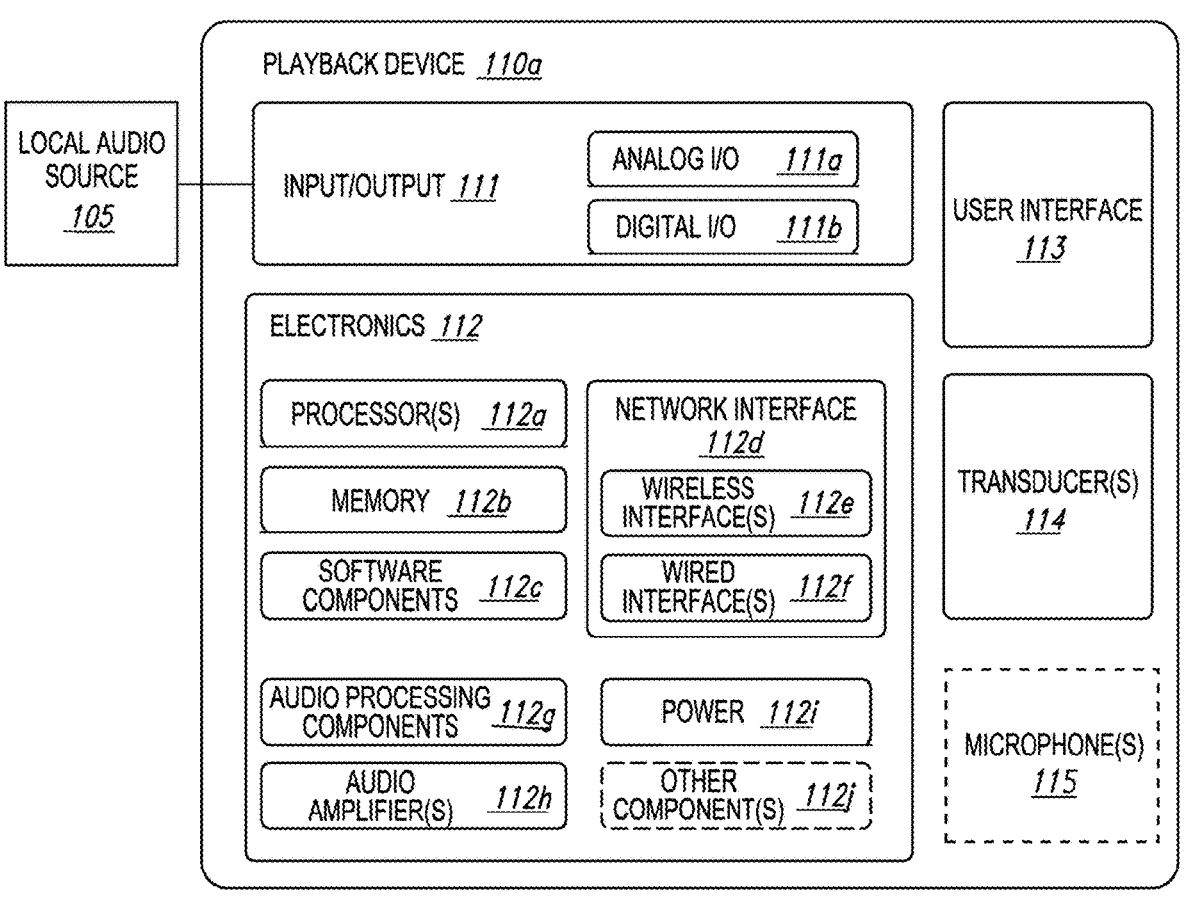
*Fig. 1C*
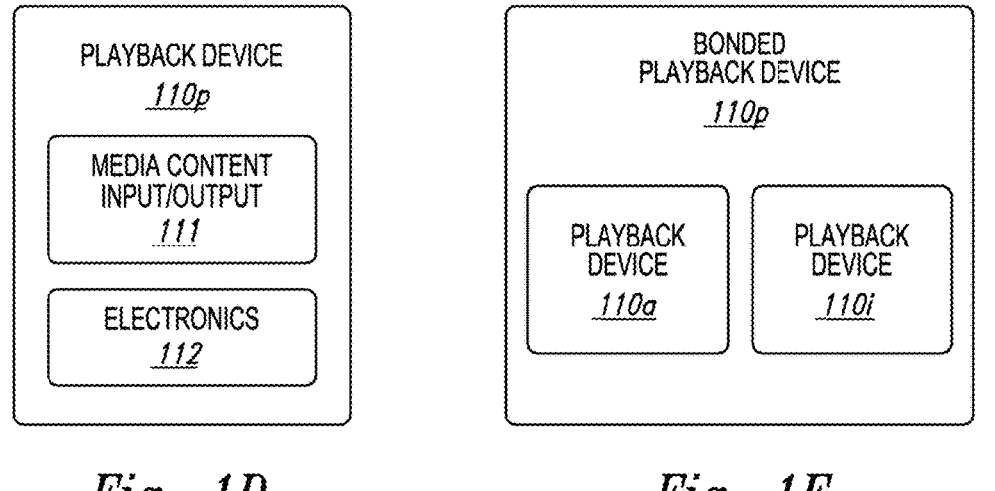
*Fig. 1D*            *Fig. 1E*

NETWORK MICROPHONE DEVICE *120a*

PROCESSOR(S) *112a*

OTHER COMPONENTS *112j*

MEMORY *112b*

USER INTERFACE *113*

SOFTWARE COMPONENTS *112c*

TRANSDUCER(S) *114*

NETWORK INTERFACE *112d*

MICROPHONE(S) *115*

POWER *112i*

VOICE PROCESSING *124*

PLAYBACK DEVICE *110r*

NMD *120d*

CONTROL DEVICE *130c*

+ Cannons
Youth Lagoon - The Year of Hiberna...

Master Bedroom

ELECTRONICS *132*

PROCESSOR(S) *132a*

MEMORY *132b*

SOFTWARE COMPONENTS *132c*

NETWORK INTERFACE(S) *132d*

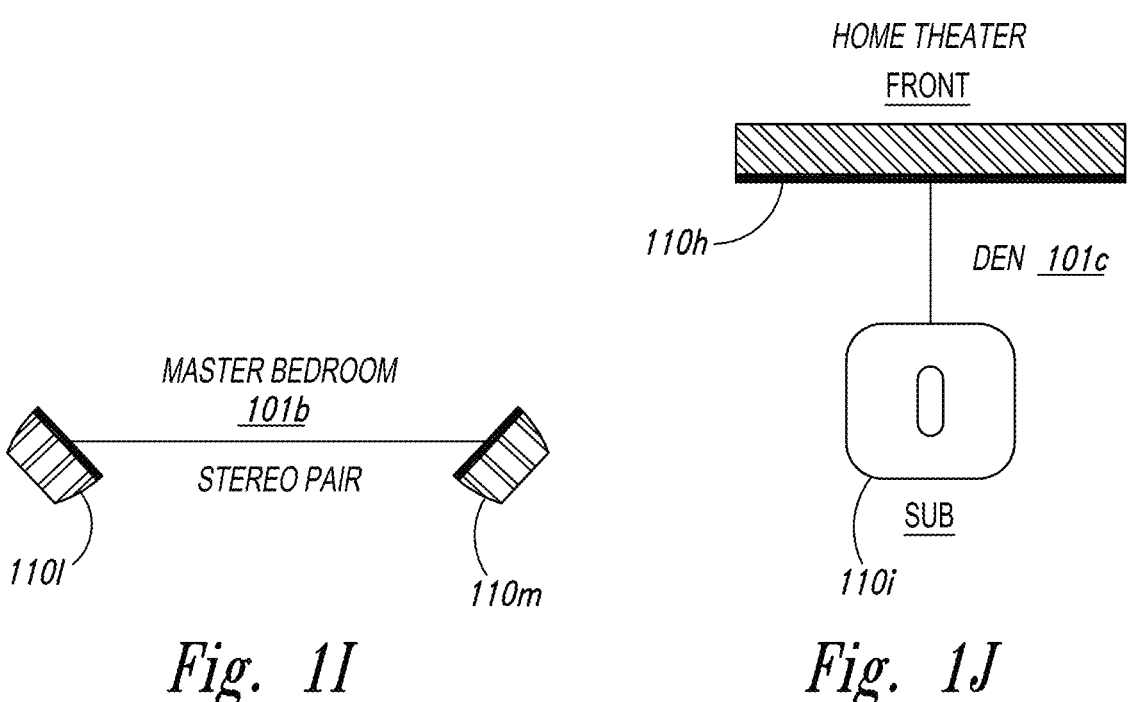
*Fig.  1I*
*Fig.  1J*
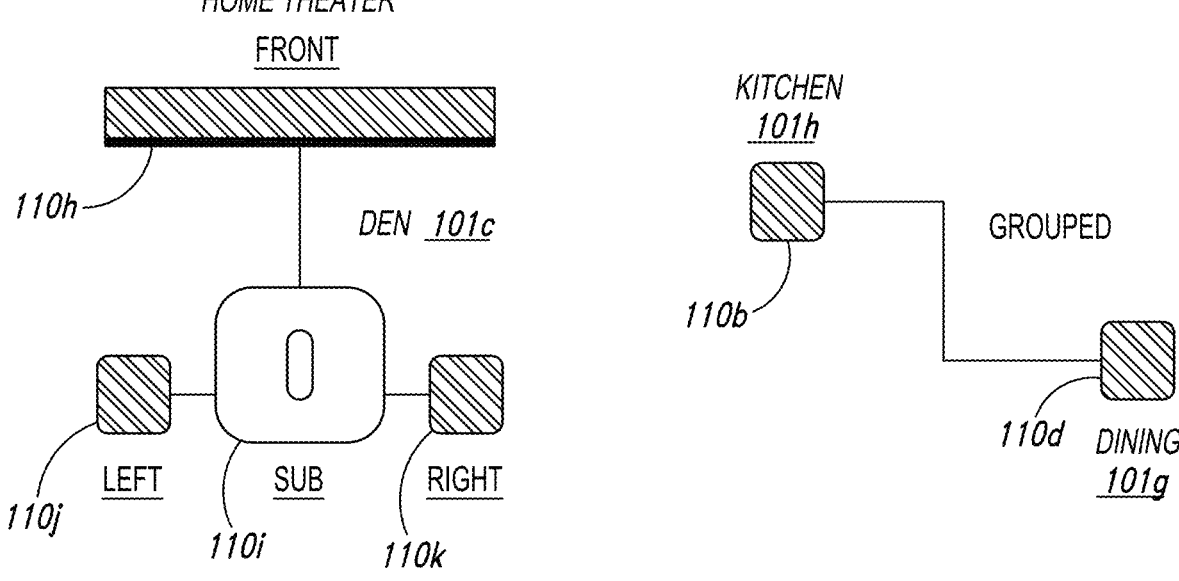
*Fig.  1K*
*Fig.  1L*

1200

1202 — DETERMINE DEVICE MOVEMENT OR ADDITION

1204 — INITIATE BEACONING SESSION FOR DEVICE

1206 — SIGNAL COLLECTION DURING BEACONING SESSION

1208 — DETERMINE SIGNAL PATTERN

1210 — DETERMINE DEVICE LOCATION BASED ON SIGNAL PATTERN MATCHING

1212 — TRANSFER PERSONALIZATION MODEL(S) BASED ON DEVICE LOCATION

TECHNIQUES FOR PERSONALIZATION MODEL TRANSFER

CROSS-REFERENCE TO RELATED APPLICATION

This application claims priority under 35 U.S.C. § 119(e) to U.S. Provisional Application No. 63/585,624 filed on Sep. 27, 2023, which is hereby incorporated herein by reference in its entirety.

FIELD OF THE DISCLOSURE

The present disclosure is related to consumer goods and, more particularly, to methods, systems, products, aspects, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback between Multiple Networked Devices," and began offering its first media playback systems for sale in 2005. The SONOS Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY

Examples relate to techniques for personalizing a user experience with a media playback system and for transferring personalization settings from one device to another within the media playback system.

In one example, a method comprises collecting during a plurality of beaconing sessions and with a network device positioned at a plurality of locations, information indicative of a plurality of patterns of wireless signals between the network device and a plurality of playback devices; with the network device, training a first parameterized machine learning model to produce a trained model that identifies one or more playback devices proximal to the network device based on one or more features derived from the information; transferring the trained model to a portable playback device; during a subsequent beaconing session, collecting, with the portable playback device, data indicative of a pattern of wireless signals between the portable playback device and the plurality of playback devices; with the portable playback device, applying the trained model to at least one feature derived from the data to identify at least one playback device of the plurality of playback devices that is proximal to the portable playback device; and with the portable playback device, communicating at least one request to the at least one playback device.

According to another example, a portable playback device comprises a wireless communication interface configured to support communication of data via at least one network protocol, at least one processor, and at least one non-transitory computer readable medium storing program instructions that are executable by the at least one processor to cause the portable playback device to: detect, via the wireless communication interface, information indicative of a pattern of wireless signals between the portable playback device and a plurality of other playback devices; detect, via the wireless communication interface, information from an external device correlating a baseline pattern of wireless signals with a location; compare the pattern of wireless signals with the baseline pattern; and based on a level of similarity between the pattern of wireless signals and the baseline pattern transgressing a predetermined threshold value, infer that a position of the portable playback device corresponds to the location.

In another example, a portable playback device comprises a wireless communication interface configured to support communication of data via at least one network protocol, at least one processor, and at least one non-transitory computer readable medium storing program instructions that are executable by the at least one processor to cause the portable playback device to: detect, via the wireless communication interface, a plurality of beacon signals emitted by a plurality of other playback devices; based on the plurality of beacon signals, determine a pattern of wireless signals between the portable playback device and the plurality of other playback devices; detect, via the wireless communication interface, information containing one or more location-based personalization settings; based on the pattern of wireless signals, infer a location of the portable playback device; and use the location of the portable playback device and at least one of the one or more location-based personalization settings to train a parameterized machine learning model to predict a setting of the portable playback device.

BRIEF DESCRIPTION OF THE DRAWINGS

Aspects, and advantages of the presently disclosed technology may be better understood with regard to the following description, appended claims, and accompanying drawings, as listed below. A person skilled in the relevant art will understand that the elements shown in the drawings are for purposes of illustrations, and variations, including different and/or additional elements and arrangements thereof, are possible.

FIG. 1C is a block diagram of a playback device according to aspects of the disclosed technology.

FIG. 1D is a block diagram of a playback device according to aspects of the disclosed technology.

FIG. 1E is a block diagram of a bonded playback device according to aspects of the disclosed technology.

FIGS. 1I through 1L are schematic diagrams of corresponding media playback system zones according to aspects of the disclosed technology.

Figure 1A:
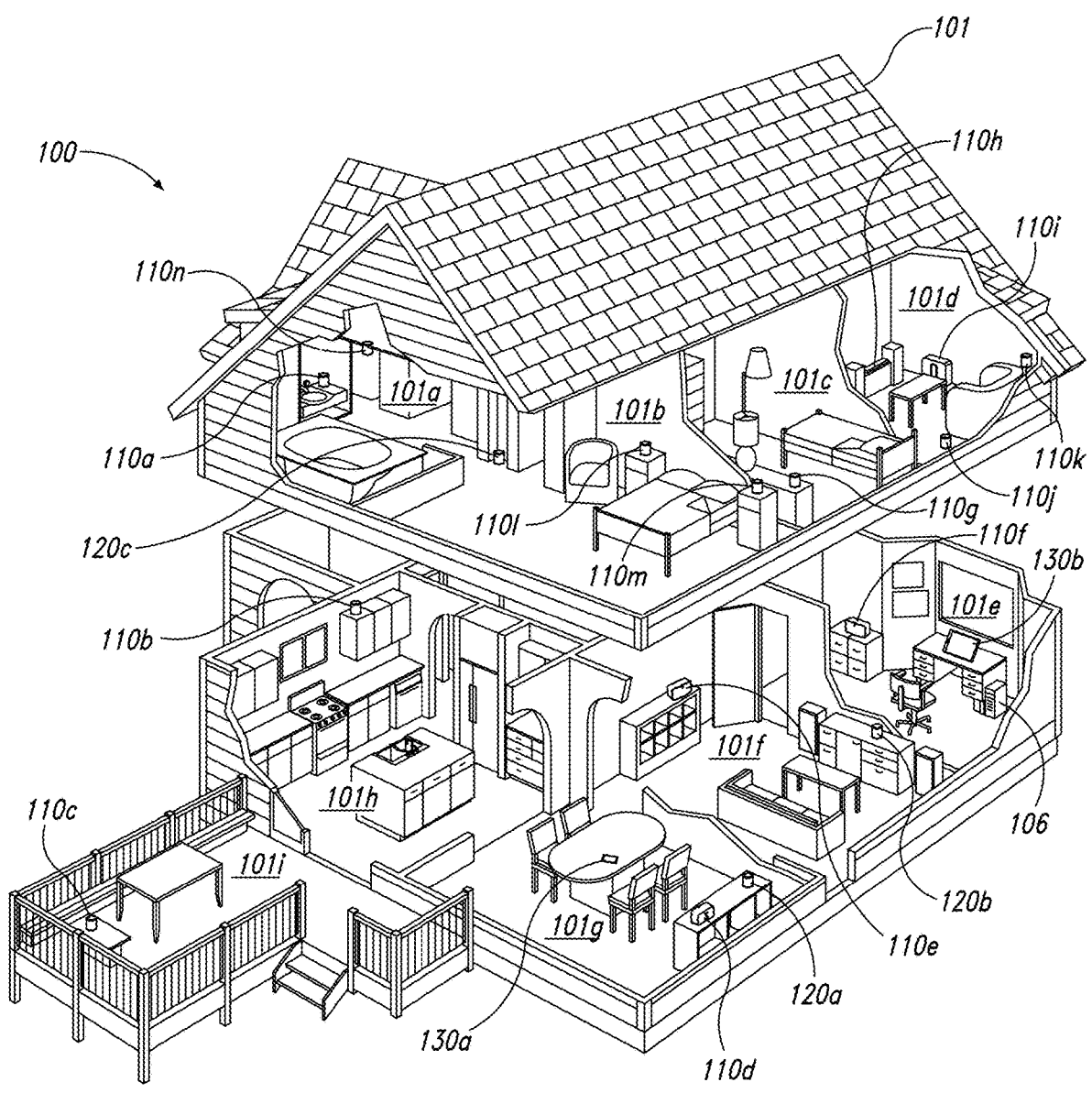
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to techniques for personalizing a user experience with a media playback system and for allowing personalization settings to be quickly and easily transferred from one device to another within the media playback system. Many users demonstrate consistent listening routines or patterns when using capabilities and/or devices within their media playback system. By determining and recognizing consistent patterns over time, the media playback system can learn to predict certain user preferences. For example, historical usage data and/or recorded patterns of movement can be used to train machine learning models that can then automatically adjust, prompt a user to confirm a proposed adjustment, or prompt a user to adjust certain settings or configurations of one of more playback devices in the media playback system. Thus, through personalization, the system can reduce the time and user effort required to achieve the predicted end result (e.g., the "time to music") and provide more confidence in an easy and enjoyable experience as the number of interacting playback devices grows in a household.

In some instances, some determined patterns or routines, and therefore the associated personalization settings, are strongly linked to the location of one or more playback devices within the media playback system environment. Accordingly, if a playback device changes location, it may be desirable to update any location-based personalization settings associated with that playback device. However, in some examples, training a machine learning model to accurately predict personalization settings can take significant time. Accordingly, aspects and embodiments disclosed herein are directed to techniques for transferring one or more trained machine learning models (referred to herein as "personalization models") from one device to another based on a location of the receiving device ("recipient"). In this manner, the recipient can apply the personalization model(s) associated with its new location without having to go through the complete learning/training process. This approach can significantly reduce the time between when a device identifies its new location and when it is ready to apply location-based personalization settings tied to the new location. This may be particularly useful for portable playback devices that frequently change location within the media playback system environment. Similarly, if a new playback device is added to a media playback system, one or more personalization models can be transferred to the new device based on its location within the media playback system environment, thus significantly reducing the time taken for the new device to become ready to apply personalization settings.

As described further below, positioning/localization information can be obtained for a portable device (such as a portable playback device or a controller) based on patterns of wireless signals between the portable device and other devices in the media playback system. For example, signal strength measurements can provide an indication of proximity among devices. However, many (particularly indoor) environments are complex and contain numerous obstructions such that maximum signal strength alone may not provide an accurate indication of proximity. Further, in some instances, proximity without context may not correlate well with user intent. For example, a user operating their media playback system with a control device may be physically very close to a playback device that is in another room (separated from the user by a wall) but actually want to interact with a different playback device that is in the same room as the user, even though it is physically further away. Accordingly, aspects and embodiments provide techniques for incorporating contextual influence into the system's predictions for location-based personalization, as described further below.

Various techniques for determining the location of a network device within the media playback system environment, training parameterized machine learning models, and applying location-based personalization approaches are described below. According to certain examples, BLU- ETOOTH Low Energy (BLE) signaling applied in combination with a parameterized machine learning model can be used to perform location-based personalization and to identify instances in which it may be appropriate to transfer personalization settings from one device to another. As discussed further below, certain examples provide techniques for applying logistic regression in a point-to-point signaling framework with BLE (or other) communication interfaces to achieve improved device targeting and localization even in complex signaling environments (e.g., where wireless signals can travel through walls or other obstacles and/or multiple signal reflections may be present). By applying these techniques, a user's experience with their media playback system may be enhanced through the ability of the system to identify and adapt to user preferences and to quickly integrate new devices and/or update system behavior when the system configuration changes (e.g., one or more playback devices are moved).

In some embodiments, for example, a method comprises, during a plurality of beaconing sessions, collecting, with a network device positioned at a plurality of locations, information indicative of a plurality of patterns of wireless signals between the network device and a plurality of playback devices, and with the network device, training a first parameterized machine learning model to produce a trained model that identifies one or more playback devices proximal to the network device based on one or more features derived from the information. In some embodiments, the method further comprises transferring the trained model to a portable playback device, during a subsequent beaconing session, collecting, with a portable playback device, data indicative of a pattern of wireless signals between the portable playback device and the plurality of playback devices, with the portable playback device, applying the trained model to at least one feature derived from the data to identify at least one playback device of the plurality of playback devices that is proximal to the portable playback device, and with the portable playback device, communicating at least one request to the at least one playback device.

While some examples described herein may refer to functions performed by given actors such as "users," "listeners," and/or other entities, it should be understood that such references are for purposes of explanation only. The claims should not be interpreted to require action by any such example actor unless explicitly required by the language of the claims themselves.

In the Figures, identical reference numbers identify generally similar, and/or identical, elements. Many of the details, dimensions, angles, and other aspects shown in the Figures are merely illustrative of particular embodiments of the disclosed technology. Accordingly, other embodiments can have other details, dimensions, angles, and aspects without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system (MPS) 100 distributed in an environment 101 (e.g., a house). In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane, etc.), multiple environments (e.g., a combination of home and vehicle environments), and/or another suitable environment where multi-zone audio may be desirable.

Within the rooms and spaces of the environment 101, the MPS 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. A stand-alone NMD 120 may omit components and/or functionality that is typically included in a playback device 110, such as a speaker or related electronics. For instance, in such cases, a stand-alone NMD may not produce audio output or may produce limited audio output. In other embodiments, an NMD is incorporated into a playback device (or vice versa). A playback device 110 that includes components and functionality of an NMD 120 may be referred to as being "NMD-equipped." Examples of playback devices 110 and NMDs 120 are described further below.

The term "control device" can generally refer to a network device configured to perform functions relevant to facilitating user access, control, and/or configuration of the media playback system 100. Examples of control devices are described further below.

In some examples, one or more of the various playback devices 110 may be configured as portable playback devices, while others may be configured as stationary playback devices. For example, certain playback devices 110 may include an internal power source (e.g., a rechargeable battery) that allows the playback device to operate without being physically connected to a mains electrical outlet or the like. In this regard, such a playback device may be referred to herein as a "portable playback device." On the other hand, playback devices that are configured to rely on power from a mains electrical outlet or the like may be referred to herein as "stationary playback devices," although such devices may in fact be moved around a home or other environment. In practice, a person might often take a portable playback device to and from a home or other environment in which one or more stationary playback devices remain.

Each of the playback devices 110 is configured to receive audio signals or data from one or more media sources (e.g., one or more remote servers, one or more local devices, etc.) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation, etc.). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-1M.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the second bedroom 101c, the office 101e, the living room 101f, the dining room 101g, the kitchen 101h, and the outdoor patio 101i each include one playback device 110, and the master bathroom 101a, the master bedroom 101b, and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-k can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 titled, "System and method for synchronizing operations among a plurality of independently clocked digital data processing devices," which is incorporated herein by reference in its entirety.

a. Suitable Media Playback System

Figure 1B:
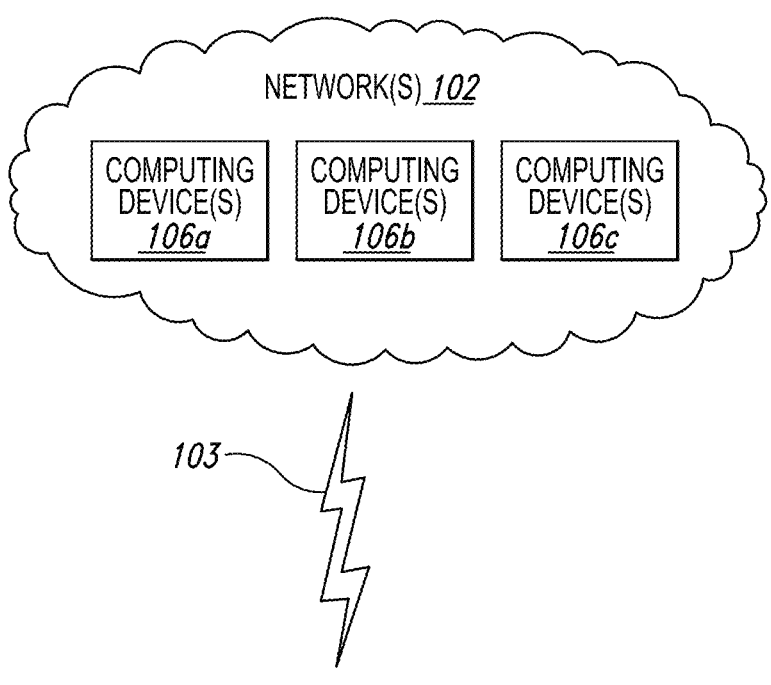
FIG. 1B is a schematic diagram of the media playback system of FIG. 1A and one or more networks according to aspects of the disclosed technology.
Figure 1B:
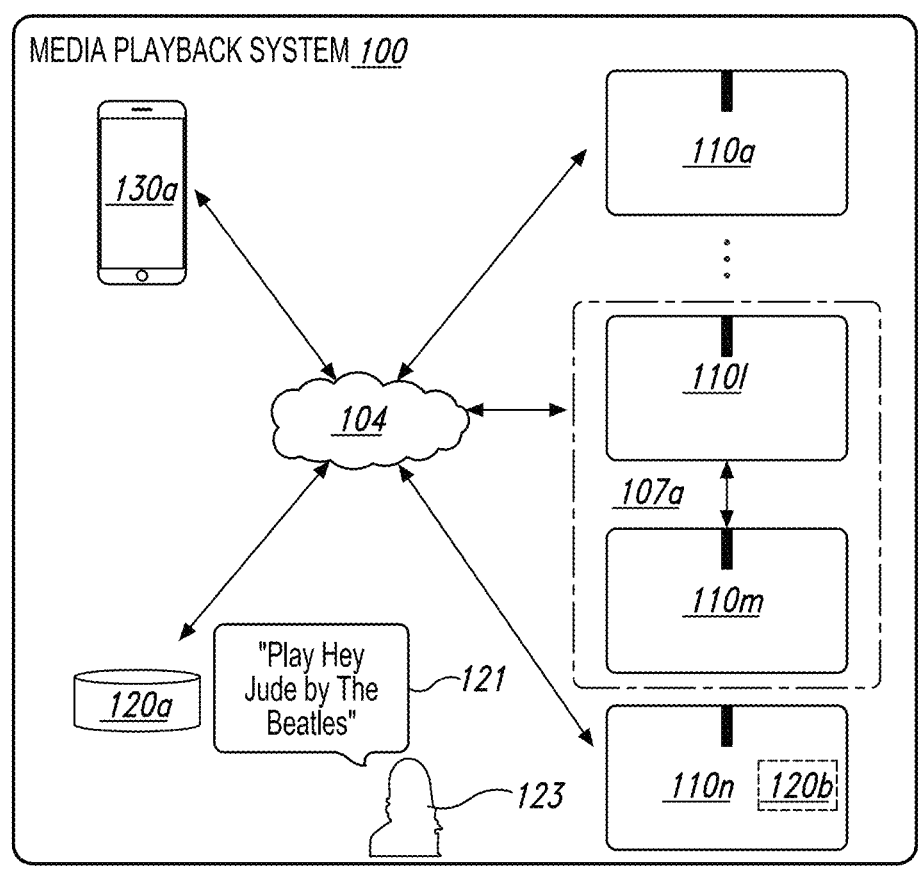

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content, etc.) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTH network, a Z-WAVE network, a ZIGBEE network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household or commercial facility communication network (e.g., a household or commercial facility WI-FI network). In some embodiments, the links 103 and the network 104 comprise one or more of the same networks. In some aspects, for example, the links 103 and the network 104 comprise a telecommunication network (e.g., an LTE network, a 5G network, etc.). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud servers that host cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length, etc.) and other associated information (e.g., URIs, URLs, etc.) for each identifiable media item found. In some embodiments, for example, the media content database is stored on one or more of the playback devices 110, network microphone devices 120, and/or control devices 130.

In the illustrated embodiment of FIG. 1B, the playback devices **110*l* and 110*m* comprise a group 107*a*. The playback devices 110*l* and 110*m* can be positioned in different rooms and be grouped together in the group 107*a* on a temporary or permanent basis based on user input received at the control device 130*a* and/or another control device 130 in the media playback system 100**. When arranged in the group 107*a*, the playback devices **110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110**. Additional details regarding groups and other arrangements of playback devices are described in further detail below with respect to FIGS. 1I through 1M.

The media playback system 100 includes the NMDs **120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100**.

In some aspects, for example, the computing device **106*c* comprises one or more modules and/or servers of a VAS (e.g., a VAS operated by one or more of SONOS, AMAZON, GOOGLE, APPLE, MICROSOFT, etc.). The computing device 106*c* can receive the voice input data from the NMD 120*a* via the network 104 and the links 103**.

In response to receiving the voice input data, the computing device **106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100** in accordance with the user's voice utterance.

b. Suitable Playback Devices

FIG. 1C is a block diagram of the playback device **110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111***b* comprises a High-Definition Multimedia Interface (HDMI) interface and/or cable. In some embodiments, the digital I/O 111*b* includes one or more wireless communication links comprising, for example, a radio frequency (RF), infrared, WI-FI, BLUETOOTH, or another suitable communication link. In certain embodiments, the analog I/O 111*a* and the digital I/O 111*b* comprise interfaces (e.g., ports, plugs, jacks, etc.) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer, etc.) or another suitable audio component (e.g., a television, a desktop computer, an amplifier, a phonograph (such as an LP turntable), a Blu-ray player, a memory storing digital media files, etc.). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens, etc.), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases, etc.).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone, etc.).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which is incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds, etc.) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receive and process the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE, etc.). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 exclude the network interface 112d altogether and transmit and receive media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DACs), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omit the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers 112h include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 include a single one of the amplifiers 112h configured to output amplified audio signals to a plurality of the transducers 114. In some other embodiments, the electronics 112 omit the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, Sonos, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "AMP," "PORT," and "SUB." Other suitable playback devices may additionally or alternatively be used to implement the playback devices of example embodiments disclosed herein. Additionally, one of ordinary skill in the art will appreciate that a playback device is not limited to the examples described herein or to Sonos product offerings. In some embodiments, for example, one or more playback devices 110 comprise wired or wireless headphones (e.g., over-the-ear headphones, on-ear headphones, in-ear earphones, etc.). In other embodiments, one or more of the playback devices 110 comprise a docking station and/or an interface configured to interact with a docking station for personal mobile media playback devices. In certain embodiments, a playback device may be integral to another device or component such as a television, an LP turntable, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is a full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110*q* includes additional playback devices and/or another bonded playback device.

c. Suitable Network Microphone Devices (NMDs)

Figures 1F, 1G, 1H:
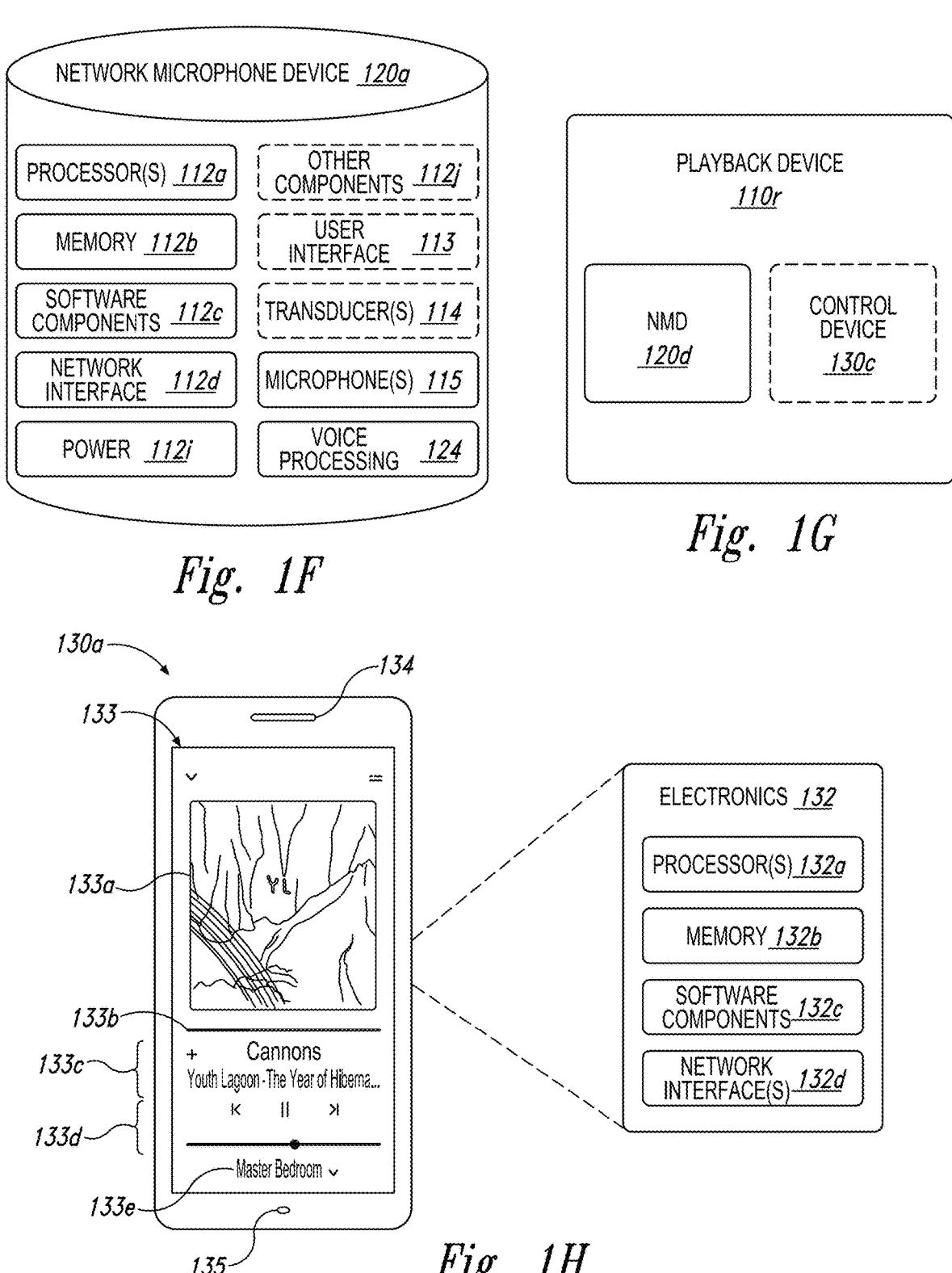
FIG. 1F is a block diagram of a network microphone device according to aspects of the disclosed technology.
FIG. 1G is a block diagram of a playback device according to aspects of the disclosed technology.
FIG. 1H is a partial schematic diagram of a control device according to aspects of the disclosed technology.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 112*h*, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1C. In some aspects, for example, the NMD 120*a* includes the processor 112*a* and the memory 112*b* (FIG. 1C), while omitting one or more other components of the electronics 112. In some embodiments, the NMD 120*a* includes additional components (e.g., one or more sensors, cameras, thermometers, barometers, hygrometers, etc.).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1C) configured to receive user input (e.g., touch input, voice input, etc.) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa." Other examples include "Ok, Google" for invoking the GOOGLE VAS and "Hey, Siri" for invoking the APPLE VAS.

After detecting the activation word, voice processing components 124 monitor the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130*a* (FIGS. 1A and 1B). As used herein, the term "control device" can be used interchangeably with "controller" or "control system." Among other aspects, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone, etc.) on which media playback system controller application software is installed. In some embodiments, the control device 130*a* comprises, for example, a tablet (e.g., an iPad™), a computer (e.g., a laptop computer, a desktop computer, etc.), and/or another suitable device (e.g., a television, an automobile audio head unit, an IoT device, etc.). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 132*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE, etc.). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection, etc.) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133*a* (e.g., album art, lyrics, videos, etc.), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year, etc.) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound, etc.) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1M:
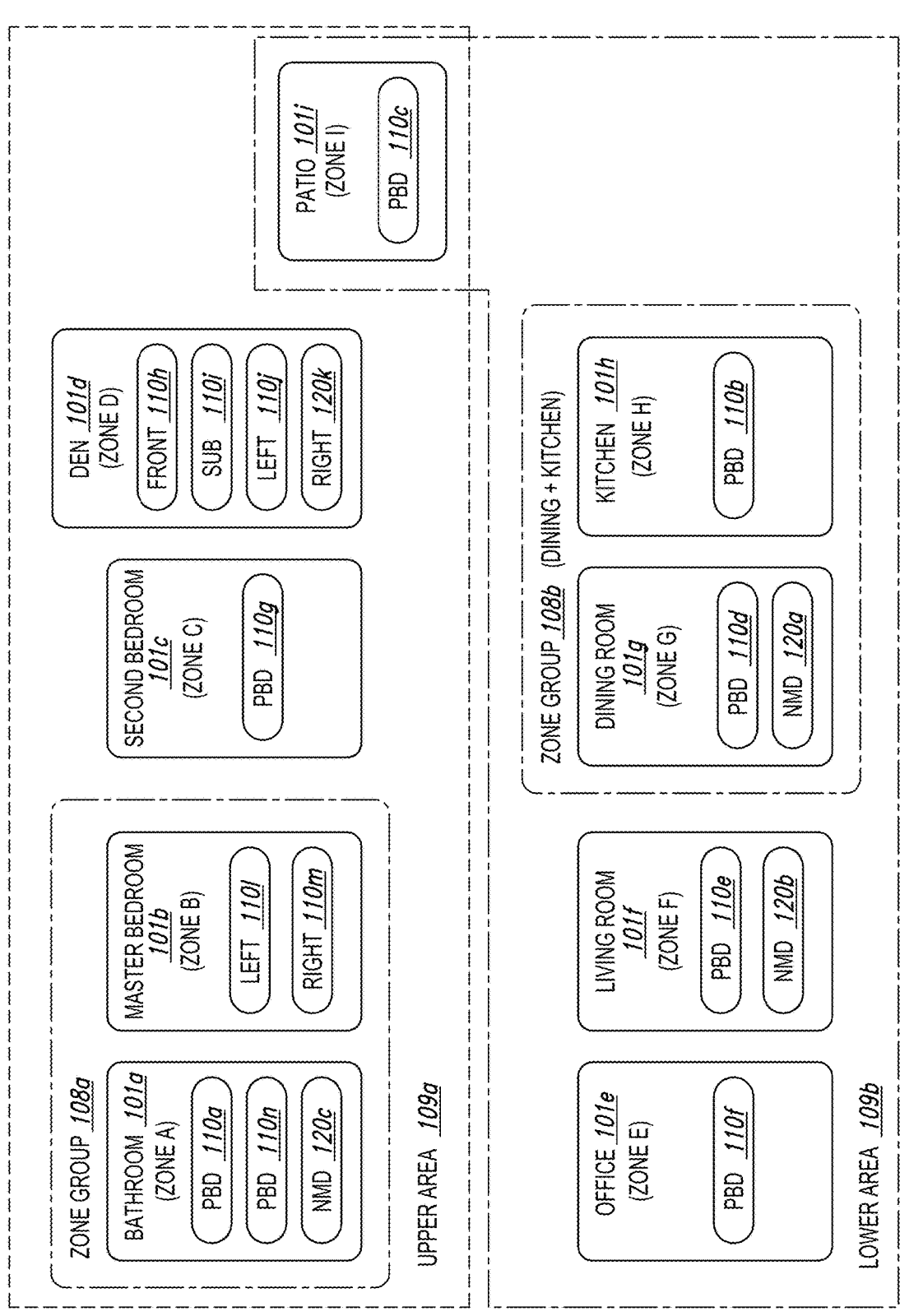
FIG. 1M is a schematic diagram of media playback system areas according to aspects of the disclosed technology.

FIGS. 1I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*b* and 110*d* can be merged to form a merged group or a zone group 108*b*. The merged playback devices 110*b* and 110*d* may not be specifically assigned different playback responsibilities. That is, the merged playback devices 110*b* and 110*d* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110*l* and 110*m* may be bonded so as to produce or enhance a stereo effect of audio content. In this example, the playback device 110*l* may be configured to play a left channel audio component, while the playback device 110*m* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured to render low frequencies. When unbonded, however, the Front device 110*h* can be configured to render a full range of frequencies. As another example, FIG. 1K shows the Front and SUB devices 110*h* and 110*i* further bonded with Left and Right playback devices 110*j* and 110*k*, respectively. In some implementations, the Left and Right devices 110*j* and 110*k* can be configured to form surround or "satellite" channels of a home theater system. The bonded playback devices 110h, 110i, 110j, and 110k may form a single Zone D (FIG. 1M).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in U.S. Pat. No. 10,499,146 filed Feb. 21, 2017 and titled "VOICE CONTROL OF A MEDIA PLAYBACK SYSTEM," which is incorporated herein by reference in its entirety for all purposes.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variable instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the memory may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D and I, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, and titled "Room Association Based on Name," and U.S. Pat. No. 8,483,853 filed Sep. 11, 2007, and titled "Controlling and manipulating groupings in a multi-zone media system." Each of these patents is incorporated herein by reference in its entirety. In some embodiments, the media playback system 100 may not implement Areas, in which case the system may not store variables associated with Areas.

III. Positioning System Examples

As discussed above, a plurality of network devices, such as playback devices 110 and/or NMDs 120, can be distributed within an environment 101, such as a user's home, or a commercial space (e.g., a restaurant, retail store, mall, hotel, etc.). Some of the devices may be in relatively fixed locations within the environment 101, whereas others may be portable and be frequently moved from one location to another. As the capabilities of these devices expand, it is becoming increasingly desirable to locate and interact with the devices within the environment 101. According to certain aspects, a positioning system can be implemented to determine relative positioning of devices within the environment 101 and optionally to control or modify behavior of one or more devices based on the relative positions. Positioning or localization information can be acquired through various techniques, optionally using sensors in some instances, examples of which are discussed below. In certain examples, one or more devices in the MPS 100, such as one or more playback devices 110, NMDs 120, or controller devices 130 may host a localization application that may implement operations (also referred to herein as functional capabilities or functionalities) that process localization information to enhance user experiences with the MPS 100. Examples of such operations include sophisticated acoustic manipulation (e.g., functional capabilities directed to psychoacoustic effects during audio playback) and autonomous device configuration and/or reconfiguration (e.g., functional capabilities directed to detection and configuration of new devices or devices that have moved or otherwise been changed in some way), among others. The requirements that these operations place on localization information vary, with some operations requiring low latency, high precision localization information and other operations being able to operate using high latency, low precision localization information.

According to certain examples, a positioning system can be implemented in the MPS 100 using a variety of different devices to generate the localization information utilized by certain application functionalities. However, the number, arrangement, and configuration of these devices can vary between examples. Additionally, or alternatively, the communications technology and/or sensors employed by the devices can vary. Given the number of variables in play within any particular MPS and the concomitant inefficiencies that this variability imposes on MPS application operation development and maintenance, some examples disclosed herein utilize one or more playback devices 110, NMDs 120, or controller devices 130 to implement a positioning system using a common positioning application programming interface (API) that decouples the positioning/localization information from specific devices or underlying enabling technologies, as illustrated conceptually in FIG. 2.

Figure 2:
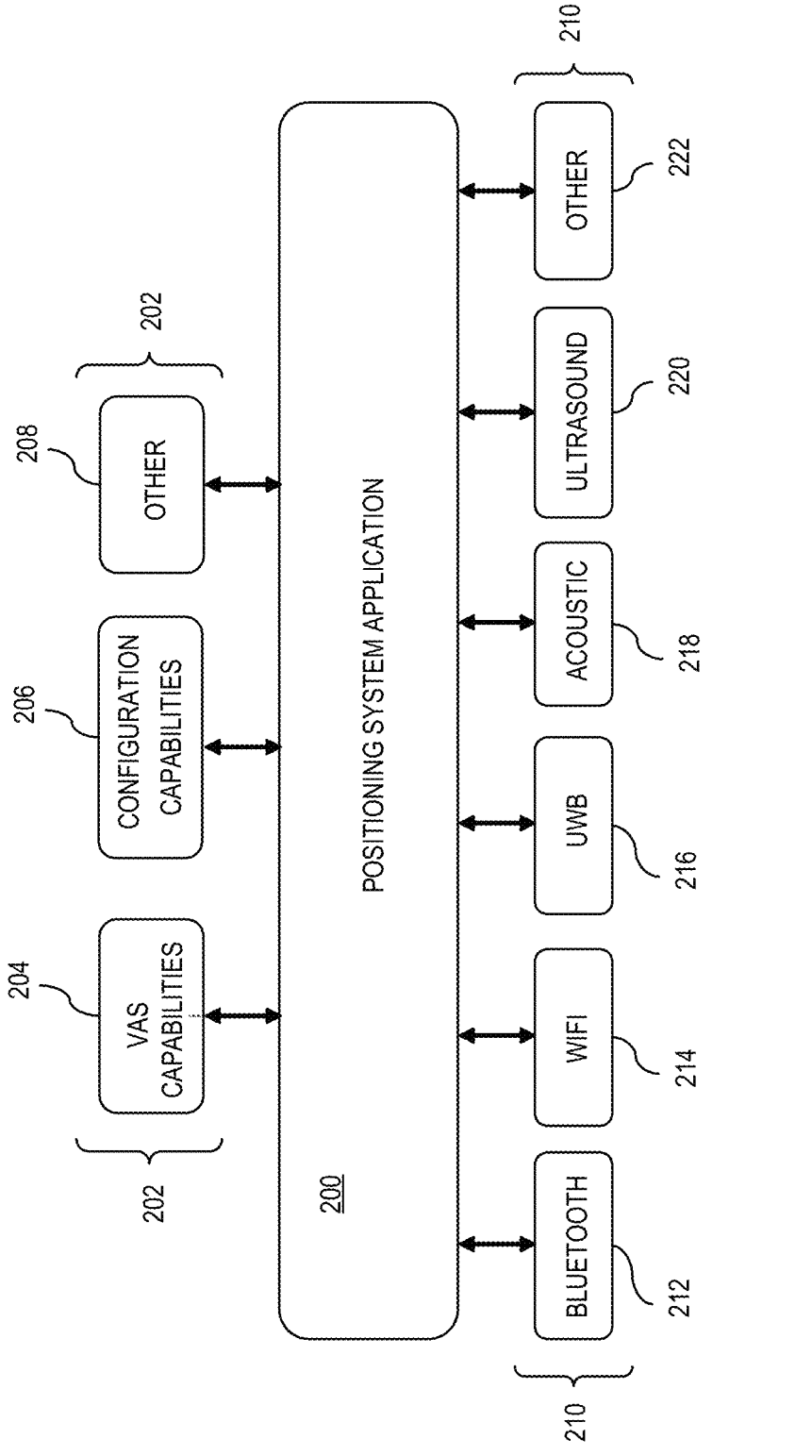
FIG. 2 is a block diagram of one example of a positioning system that can be implemented in a media playback system, according to aspects of the disclosed technology.

Referring to FIG. 2, any one or more playback devices 110, NMDs 120, or controller devices 130 in the MPS 100 ("MPS devices") can host a positioning system application 200. In certain implementations, one or more remote computing devices can facilitate hosting the application. The positioning system application 200 implements an application programming interface (API) that exposes positioning/localization information, and metadata pertinent thereto, to MPS application functionalities 202. The MPS functionalities 202 may include a wide variety of functional capabilities relating to various user experiences and aspects of the operation of the MPS 100. For example, the MPS functionalities 202 may include one or more VAS capabilities 204, such as voice disambiguation capabilities and arbitration between different NMDs receiving the same voice inputs, for example. The MPS functionalities 202 may also include one or more MPS and/or device configuration capabilities 206, such as automatic home theater configuration or reconfiguration, dynamically accommodating portable playback devices in home theater environments, dynamic room assignment for portable playback devices or their associated docks, and contextual orientation of controller devices 130, to name a few. The MPS functionalities 202 may further include one or more other functional capabilities 208 that use positioning/localization information. To support these and other MPS functionalities 202, positioning/localization information may be used to determine various pieces of information related to the locations of MPS devices within the environment 101. For example, the positioning/localization information may be used by some MPS functionalities 202 to keep track of which playback devices 110 or NMDs 120 are in a given room or space (e.g., which playback devices are in the Living Room 101f; in which room is playback device 110d, or which playback devices 110 are closest to the controller device 130). The positioning/localization information may further be used to determine the distance and/or orientation between playback devices 110 (with varying levels of precision), or to determine the acoustic space around NMDs 120 or NMD-equipped playback devices 110 (e.g., which playback devices 110 can be heard from NMD 120a). Thus, the positioning/localization information may be used to determine information about the topology of the MPS 100 within the environment 101, which information may then be used to automatically and dynamically create or modify user experiences with the MPS 100 and support the MPS functionalities 202.

In some examples, the positioning/localization information is obtained through the exchange of wireless signals among network devices (point-to-point signaling) within the MPS 100. For example, in response to a signaling trigger, some or all of the MPS devices emit one or more wireless signals and "listen" for the wireless signals emitted by other MPS devices. Each of the wireless signal can include a device identifier that identifies the network device from which the respective wireless signal was emitted. Based on detecting the various wireless signals, one or more of the MPS devices can determine certain positioning/localization information. For example, one or more MPS devices may establish a reference pattern that describes distances and directions between MPS devices based on signal strength measurements. In another example, an MPS device may detect the presence of another MPS device based on detecting the wireless signal(s) emitted by the other MPS device. In some examples, the signaling trigger is based on a schedule. For example, some or all of the MPS devices can be configured to periodically emit and/or listen for wireless signals. In another example, a coordinating MPS device may broadcast an instruction to other MPS devices directing the other MPS devices to emit and/or listen for wireless signals. In another example, a portable playback device that detects its movement (e.g., through an on-board sensor, such as a inertial measurement unit, or through connection to or disconnection from its docking station, or via some other mechanism) may broadcast a request for other MPS devices to emit the wireless signals, such that the portable playback device can determine its new position relative to one or more of the other MPS devices by detecting the wireless signals emitted by the one or more other MPS devices. Various other examples are possible.

The positioning/localization information and metadata exposed by the positioning system application 200 may vary depending on the underlying communications technologies and/or sensor capabilities 210 within the MPS devices that are used to acquire the information and/or the needs of the particular MPS functionality 202. For example, certain MPS devices may be equipped with one or more network interfaces 224 that support any one or more of the following communications capabilities: Bluetooth 212, WI-FI 214 or ultra-wide-band technology (UWB 216; a short-range radio frequency communications technology). Further, certain MPS devices may be equipped to support signaling via acoustic signaling 218, ultrasound 220, or other signaling and/or communications means 222. Certain technologies 210 may be well-suited to certain MPS functionalities 202 while others may be more useful in other circumstances. For example, UWB 216 may provide high precision distance measurements, whereas WI-FI 214 (e.g., using RSSI signal strength measurements) or ultrasound 220 may provide "room-level" topology information (e.g., presence detection indicating that a particular MPS device is within a particular room or space of the environment 101). In some examples, combinations of the different technologies 210 may be used to enhance the accuracy and/or certainty of the information derived from the positioning/localization information received from one or more MPS devices via the positioning system application 200. For example, as discussed further below, in some instances, presence detection may be performed primarily using ultrasound 220; however, RSSI measurements may be used to confirm the presence detection and/or provide more precise localization information in addition to the presence detection.

Examples of MPS devices equipped with ultrasonic presence detection are disclosed in U.S. Patent Publication Nos. 2022/0066008 and 2022/0261212, each of which is hereby incorporated herein by reference in its entirety for all purposes. Examples of localizing MPS devices based on RSSI measurements are disclosed in U.S. Patent Publication No. 2021/0099736, which is herein incorporated by reference in its entirety for all purposes. Examples of performing location estimation of MPS devices using WI-FI 214 are disclosed in U.S. Patent Publication No. 2021/0297168, which is herein incorporated by reference in its entirety for all purposes.

In addition to the positioning/localization information itself, some examples of the positioning system application 200 can expose metadata that specifies localization capabilities of the host MPS device, such as precision and latency information and availability of the various underlying capabilities 210. As such, the positioning system application 200 enables the MPS functionalities 202 each to utilize a common set of API calls to identify the localization capability present within their host MPS device and to access positioning/localization information made available through the identified capabilities 210.

As shown in FIG. 2 and discussed above, the positioning system application 200 can interoperate with MPS devices that support a wide variety of localization capabilities, such as Bluetooth 212, WI-FI 214, UWB 216, acoustic signaling 218 and/or ultrasound 220, among others 222. In some examples, the positioning system application 200 includes one or more adapters configured to communicate with MPS devices using syntax and semantics specific to the localization capability 210 of the MPS devices. This architecture shields the MPS functionalities 202 from the complexity of interoperating with each type of MPS device. In some examples, each adapter can receive and process a stream of positioning/localization data from the MPS devices using any one or more of the communications capabilities 210. The adapters can interoperate with an accumulation engine within the positioning system application 200 that analyzes and merges (e.g., using a set of configurable rules) positioning/localization data obtained by the adapters and populates data structures that contain the positioning/localization information and the metadata described above. These data structures, in turn, are accessed and the positioning/localization information, and metadata, are retrieved by the positioning system application 200 in response to API calls received by the positioning system application 200 to support the MPS functionalities 202. The positioning/localization information, and metadata, can specify, in some examples, position/location of a device relative to other device, absolute position/location (e.g., within a coordinate system) of a device, presence of device (e.g., within a structure, room, or as a simple Boolean value), and/or orientation of a device.

For instance, in some examples, the positioning/localization information is expressed in two dimensions (e.g., as coordinates in a Cartesian plane), in three dimensions (e.g., as coordinates in a Cartesian space), or as coordinates within other coordinate systems. In certain examples, the positioning/localization information is stored in one or more data structures that include one or more records of fields typed and allocated to store portions of the information. For instance, in at least one example, the records are configured to store timestamps in association with values indicative of location coordinates of a portable playback device taken at a time given by the associated timestamp. Further, in at least one example, the records are configured to store timestamps in association with values indicative of a velocity of a portable playback device taken at a time given by the associated timestamp. Further, in at least one example, the records are configured to store timestamps in association with values indicative of a segment of movement (starting and ending coordinates) of a portable playback device taken at times given by associated timestamps. Other examples of positioning/localization information, and structures configured to store the same, will be apparent in view of this disclosure.

It should be noted that the API and adapters implemented by the positioning system application 200 may adhere to a variety of architectural styles and interoperability standards. For instance, in one example, the API is a web services interface implemented using a representational state transfer (REST) architectural style. In this example, the API communications are encoded in Hypertext Transfer Protocol (HTTP) along with JavaScript Object Notation and/or extensible markup language. In some examples, portions of the HTTP communications are encrypted to increase security. Alternatively, or additionally, in some examples, the API is implemented as a. NET web API that responds to HTTP posts to particular URLs (API endpoints) with localization data or metadata. Alternatively, or additionally, in some examples, the API is implemented using simple file transfer protocol commands. Also, in some examples, the adapters are implemented using a proprietary application protocol accessible via a user datagram protocol socket. Thus, the adapters and the API as described herein are not limited to any particular implementation.

IV. Examples of Personalization Model Transfer Techniques

There are numerous instances where it can be desirable for certain settings or configurations of one or more playback devices in the MPS 100 to be automated or streamlined based on recognized user patterns and preferences. In many instances, user interactions with playback devices and/or certain device interactions with each other (e.g., forming a bonded group) are closely linked to the contextual location of devices within the environment 101. Although the positioning system described above can be used to determine the relative locations of MPS devices in the environment, numerous challenges remain with respect to location-based personalization. For example, due to wide variety in different floorplans and various interfering objects found indoors (e.g., walls, appliances, furniture, etc.), it can be difficult to reliably determine the location of a device in some environments. In addition, relative location or proximity alone may provide insufficient context to correctly identify a target device to interact with. For example, a user may always turn on a playback device in the kitchen first thing in the morning from their bedroom, even though a closer playback device is present in their bedroom, because they intend to go to the kitchen. Similarly, if a portable playback device is moved into an area where there is a home theater set-up, the user may wish to have the portable playback device form a bonded group with the home theater primary device, rather than another device unrelated to the home theater set-up, even if that other device is physically closer to the portable playback device. Furthermore, while routines can play a significant role in users' interactions with their media playback systems, these routines can shift over time. For example, users may have a different routine during the week versus over the weekend, during the summer versus during the winter, or during school vacation periods versus during school semesters.

Accordingly, aspects and embodiments provide techniques for collecting household pattern data (e.g., device configuration settings, such as volume, playlist selection, etc., device movement within the environment, bonding information, etc.) to use in combination with positioning/localization information to train one or more parameterized machine learning personalization models specific to a user (or household). Personalization techniques disclosed herein determine when a trend or pattern within the media playback system 100 has been established, such that there exists a relatively high likelihood that the user would want system configurations or behavior to be automated in the future according to this pattern. Such processes can result in more accurate predictions with less manual user input. Examples of personalization models include target device prediction models that predict which playback device 110 a user would want to interact with next (which may or may not be the player closest to the user) based at least in part on the location of the user (or user's control device), power management models (e.g., that may predict when certain playback devices should enter/exit a power-saving or "sleep" mode), setting control models (e.g., for volume personalization, playlist selection, etc.), and grouping models (e.g., that predict whether certain playback devices should form or break bonded groups based at least in part on the location of one or more playback devices).

In some instances, the arrangement of playback devices within an environment can change over time. For example, portable playback devices frequently may be moved from one location to another. Similarly, the arrangement can change as users acquire new devices and add them to the MPS 100. In some examples, point-to-point signaling among playback devices and the establishment of both location-specific signal patterns and area-wide reference patterns allows for player movement to be identified within an environment. In some examples, changing relative position can be identified by baseline reference pattern mismatch, as described further below. By transferring trained personalization models from one device to another based on a determined location of the recipient, techniques disclosed herein allow the system to adapt to movement of one or more playback devices 110 within an environment (e.g., the environment 101) and to the addition of new playback devices 110 to the media playback system 100.

Figure 3A:
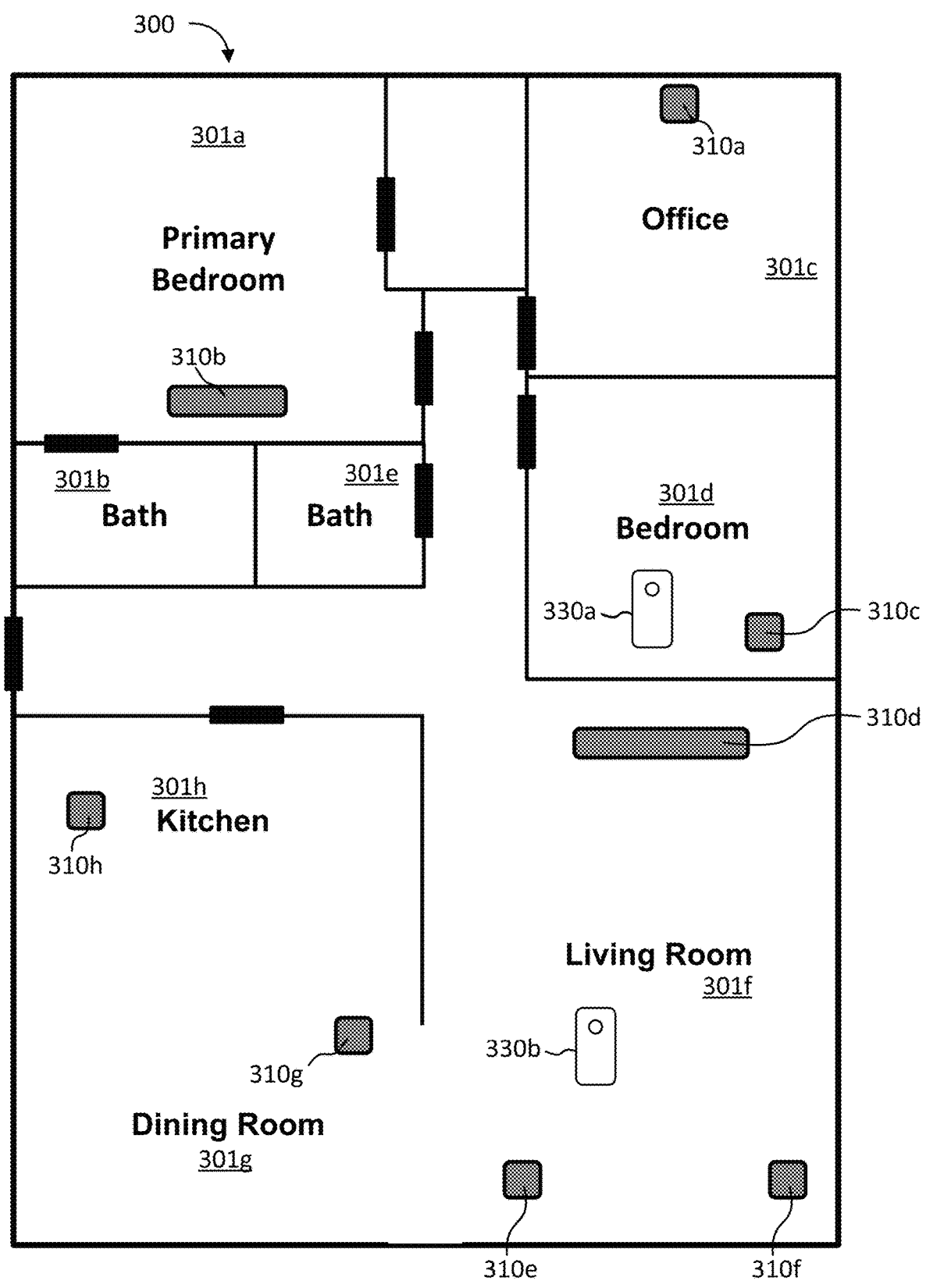
FIG. 3A is a plan view of another example of an environment having a media playback system configured according to aspects of the disclosed technology.

Referring to FIG. 3A, there is illustrated an example of an environment 300 in which an MPS 100 can be deployed and in which various examples of the techniques and processes disclosed herein can be implemented. In this example, the environment 300 includes a plurality of rooms, namely, a master/primary bedroom 301*a*, a master bathroom 301*b*, an office 301*c*, a second bedroom 301*d*, a second bathroom 301*e*, a living room 301*f*, a dining room 301*g*, and a kitchen 301*h*. A plurality of playback devices 310 (individually identified as playback devices 310*a-h*) are distributed about the environment 300. The playback devices 310 may be any of the playback devices 110 or NMDs 120 described above. It will be appreciated that the layout of the environment 300 is intended as illustrative only, and a wide variety of other layouts and configurations are possible.

As described above, in certain examples, positioning/localization information can be obtained through the exchange of wireless signals among the playback devices 310. The wireless signals can be radio frequency (RF) signals, transmitted, for example, in accord with a BLE protocol or an 802.11 WI-FI protocol, or can be acoustic or ultrasound signals. Since the wireless signals attenuate with distance traveled, in some instances, measured signal strength at a receiving device can provide an indication of how close the transmitting device is to the receiving device. However, a multi-room environment, such as the environment 300, can present numerous challenges in terms of device localization and position-based control.

For any type of sensing, an obstruction leads to attenuation effects that have varying influences. Acoustic signals, for example, may be more strongly attenuated by obstructions than electromagnetic signals, such as radio transmissions. For example, 2.4 GHz radio transmissions (as may be used for BLE and some WI-FI signaling) are capable of penetrating the materials that make up typical homes, such as drywall, wood, glass, etc. As a result, walls and wood/glass furniture may not significantly attenuate these signals (depending on the thickness), whereas metal may have a stronger influence on signal strength. However, the nature, or even presence, of various obstructions within the environment may be unknown and as a result, signal strength often may not be a reliable indicator of proximity or distance between devices. Further, while the straight line distance between two playback devices 310 may have a strong influence on capabilities such as device targeting where RF signaling is used, for acoustic signaling, obstructions may be more impactful than distance.

Different signaling technologies can have associated advantages and disadvantages. For example, since acoustic signals are sensitive to obstructions (including walls), this may limit the useful range of acoustic signaling for positioning, whereas acoustic signaling can be very useful for in-room presence detection. Further, certain playback devices 310, such as a device that is connected to a powered down TV or located within an acoustically sealed piece of furniture, may be unavailable to transmit or receive acoustic tones. The use of ultrasonic signaling may consume more power than using low energy BLUETOOTH (e.g., BLE) signaling, for example, which may be a significant consideration for battery constrained portable devices. Examples described below will refer to the use of BLE signals for positioning and device localization; however, the techniques described herein may be applied to signals other than BLE signals (e.g., WI-FI signals, acoustic signals, ultrasonic signals, etc.).

In certain examples, some or all of the playback devices 310 have a wireless communication interface (e.g., wireless interface 112*e*) that supports communication of data via at least one network protocol, such as a BLE and/or 802.11 WI-FI protocol, for example. Accordingly, the playback device 310 may include one or more WI-FI radios and/or BLE radios. A BLE radio may be configured to transmit and receive advertisement packets that allow for reading of the received signal strength indicator (RSSI) values associated with the BLE transmissions, which can be used for location tracking and positioning, as described further below.

According to certain examples, there is provided a system that incorporates BLE transmissions from a portable device, such as a controller 330 (e.g., a control device 130 described above), signaling between the playback devices 310, and user interactions to train one or more parameterized machine learning models for location-based personalization. In addition, the BLE transmissions can be used to produce location-specific signal patterns that can then be used to identify opportunities for personalization model transfer based on pattern matching. For example, the controller 330 and the playback devices 310 can be configured to transmit and detect BLE transmissions. These transmissions can be used to develop signal patterns that can be tied to various locations of the controller 330 within the environment 300 and/or associated with particular user behavior and preferences. Once a location-based activity routine has been learned, it can be automated or streamlined for an enhanced user experience. Further, by transferring information corresponding to location-based personalization to new or moved devices arriving at a particular location, these devices can quickly apply the relevant personalization settings, without having to go through a complete learning process. This may allow the system to adapt more quickly and seamlessly to altered arrangements of devices within the environment 300 and to smoothly integrate new devices.

Figure 3B:
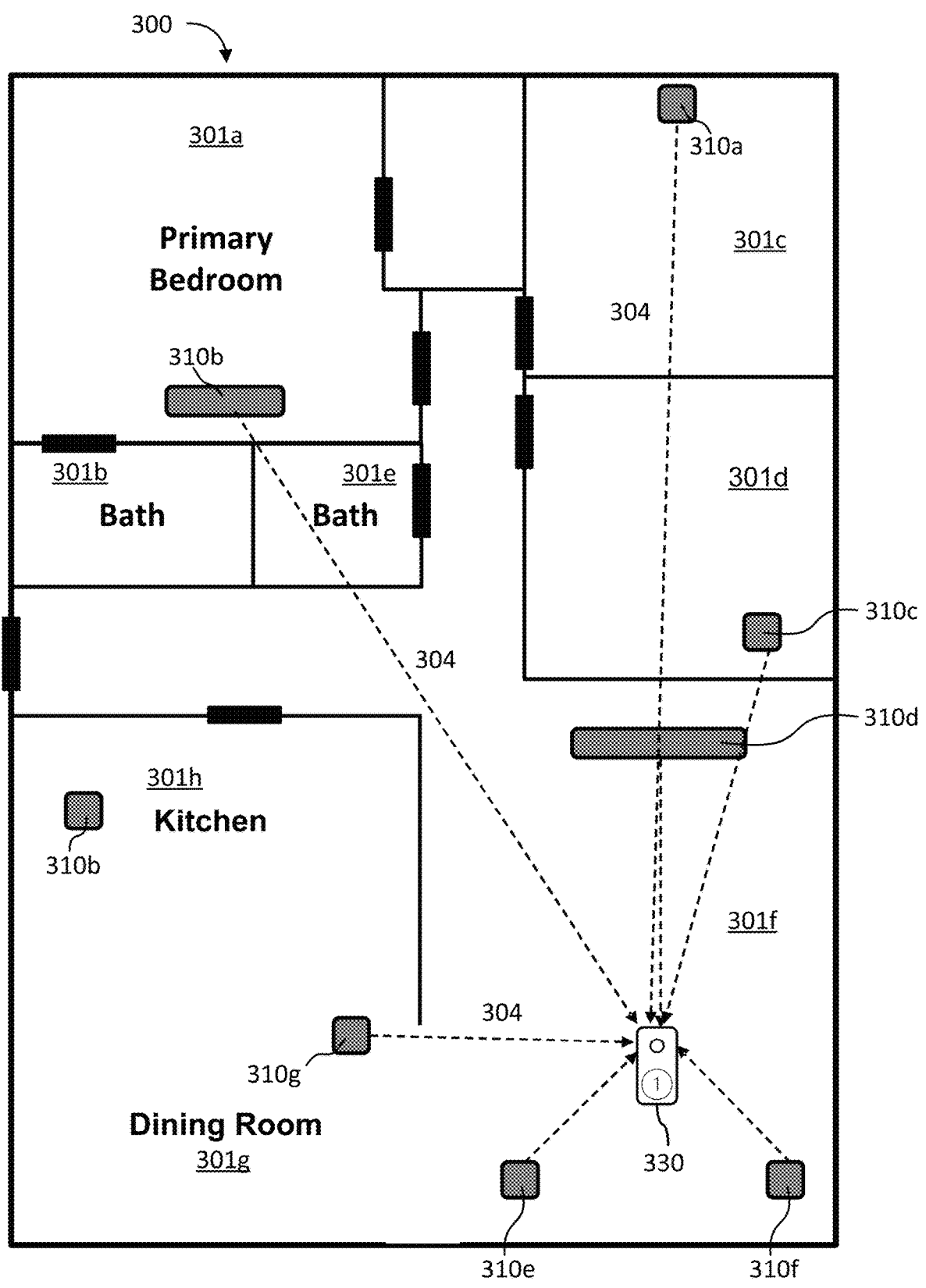
FIGS. 3B through 3D are plan views of examples of the environment of FIG. 3A showing signal transmissions according to aspects of the disclosed technology.

According to certain examples, two signaling approaches can be employed to collect information that can be used to produce signal patterns that are in turn used by a machine learning personalization service to predict location-based actions, such as the selection of a target device for interaction, among other examples. According to a first approach, signal collection between a portable device, such as the controller 330 or a portable playback device 310, for example, is used to establish a signal pattern that is tied to the location of the portable device. Referring to FIG. 3B, in some examples, the portable device employs passive signal collection, collecting "beacon" signals 304 that are broadcast by some or all of the other MPS devices in the network or environment 300. For the purposes of illustration, the following discussion will refer to the portable device as being the controller 330 (as illustrated in FIG. 3B); however, the portable device may be a device other than the controller 330, such as a portable playback device or another portable network device. FIG. 3B illustrates an example of the controller 330 in location 1 collecting beacon signals 304 emitted by playback devices 310*b*, 310*a*, 310*c*, 310*d*, 310*e*, 310*f*, and 310*g*. A signal pattern can then be produced based on the collected beacon signals, as described further below.

Figure 3C:
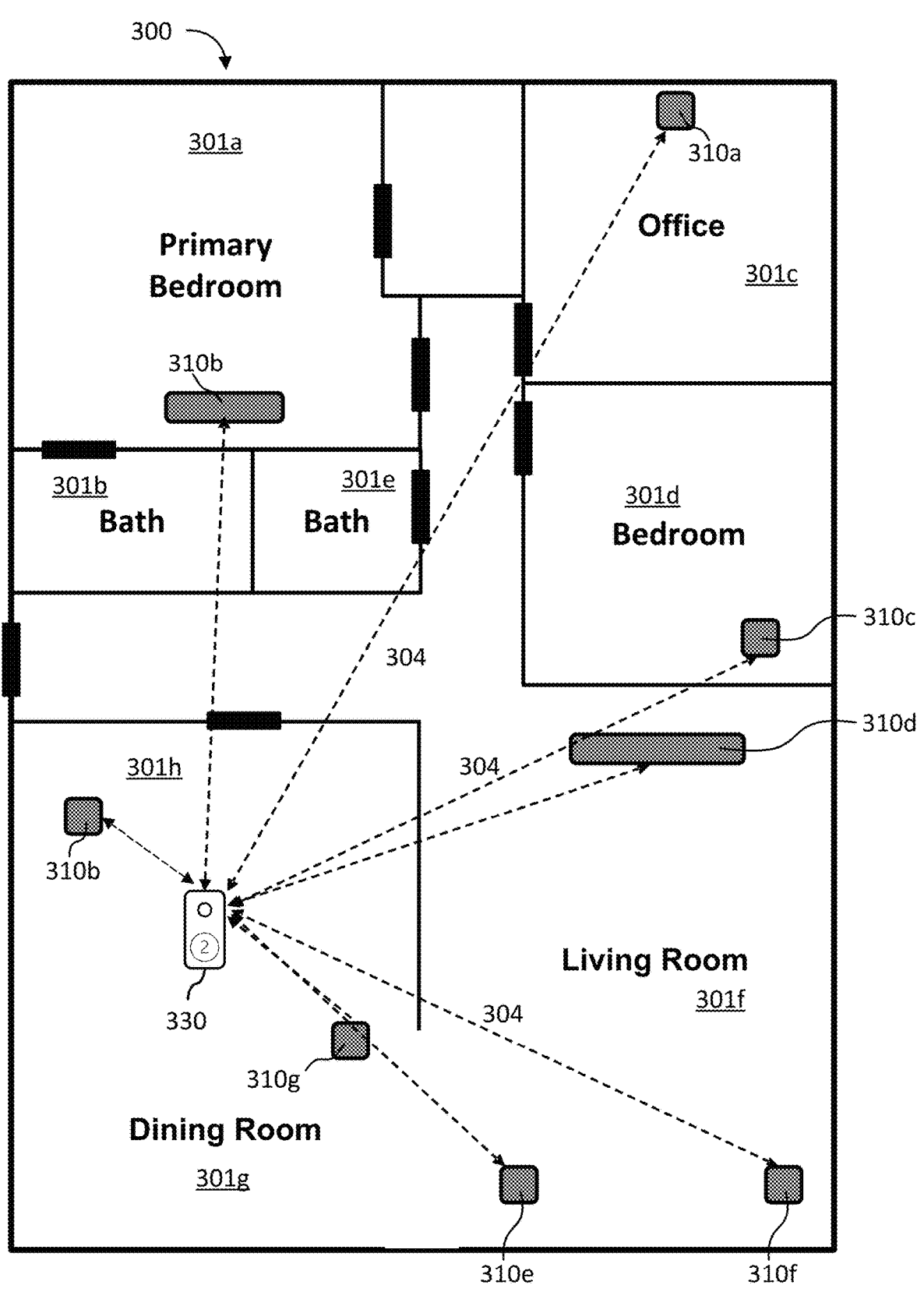

In other examples, the portable device (e.g. the controller 330) is further configured to emit its own beacon signals, as well as to detect beacon signals that are emitted by the other MPS devices. FIG. 3C illustrates an example of the controller 330 at location 2 capable of both transmitting and receiving beacon signals 304. In this case, some or all of the playback devices 310 produce signal data corresponding to those beacon signals 304 emitted by the controller 330 that the individual playback device 310 has detected. The signal data from the playback devices 310 can be collected and combined with signal data produced by the controller 330 (based on the beacon signals 304 it detected that were emitted by the other MPS devices), and the signal pattern can be produced based on the combined data.

In both of the above cases, the signal pattern is produced based on beacon signals 304 that are transmitted and/or received by the portable device. The resulting signal pattern is correlated with the location of the portable device at the time of the exchange of beacon signals, as described further below. For example, the signal pattern produced in the example of FIG. 3B will be correlated with location 1, whereas the signal pattern produced in the example of FIG. 3C will be correlated with location 2.

Figure 3D:
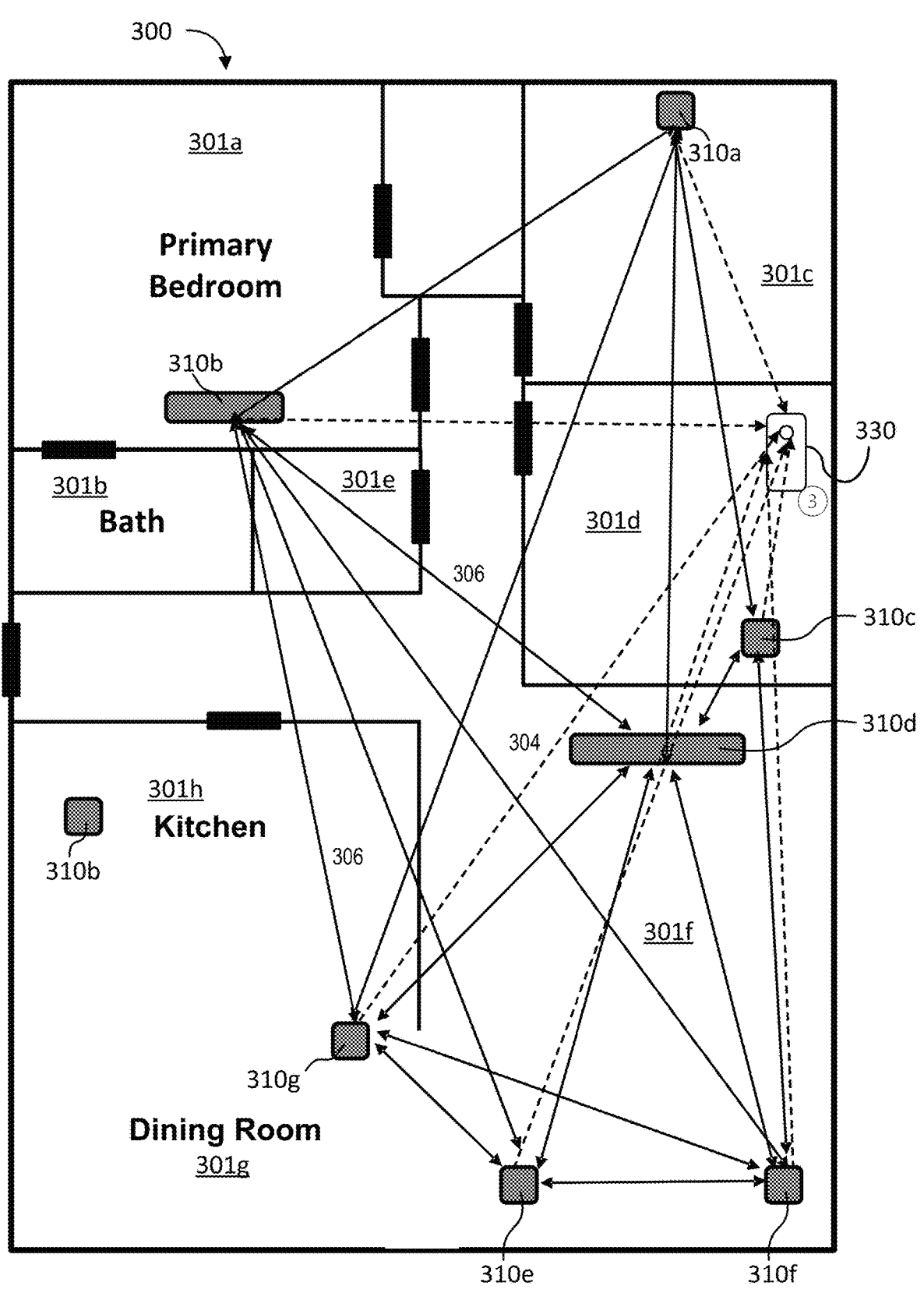

According to a second approach, the playback devices 310 can transmit and receive reference signals among themselves (point to point transmissions between playback devices), as described above with reference to FIG. 2. These reference signals can be used to produce a reference signal pattern that can be overlaid with the signal pattern produced based on the beacon signals and used to provide a reference framework for signal normalization and/or relative positioning of the portable device, as described further below. FIG. 3D illustrates such an example, with the controller 330 shown at location 3. In this example, the beacon signals 304 transmitted and/or received by the controller 330 and optionally one or more playback devices 310 are shown using dashed lines, while reference signals 306 transmitted and received among the playback devices 310 are shown using solid lines.

In certain examples, at least some of the playback devices 310 may be stationary devices that do not frequently change location in the environment 300. Accordingly, the reference pattern, or at least certain parts thereof, may remain relatively constant over time and be independent of the location of the controller 330. In contrast, each signal pattern produced based on the beacon signals 304 may be different depending on the corresponding location of the controller 330. Thus, the signal patterns produced from the beacon signals 304 can be used by the machined learning personalization service to establish location-based personalization attributes, such as location-based device targeting, automatic grouping, etc., as described further below. In addition, by acquiring signal patterns from beacon signals 304 for multiple locations within the environment 300 (e.g., using the controller 330 and/or various playback devices 310), the signal patterns can be used to localize another device through pattern matching. For example, if a playback device (e.g., a portable playback device or a new playback device) acquires a signal pattern that matches (e.g., is similar to within some specified tolerance) a previously-produced signal pattern, it can be determined that the location of the playback device corresponds to the location associated with the previously-produced signal pattern. Accordingly, relevant corresponding location-based personalization information can be transferred to the playback device.

As described further below, the reference pattern can be used to link the signal patterns acquired using the beacon signals 304 to identifiable relative locations within the environment, the relative locations being positions relative to one or more playback devices 310, rather than absolute positions within the environment 300. In addition, changes in the reference pattern can indicate changes in the environment 300, such as the addition of a new playback device 310 or movement of a playback device from one location to another. As such, in some examples, these changes may be used as a trigger to update training of one or more personalization models used by the personalization service since some learned location-based preferences may no longer be valid in the changed environment, as discussed further below.

Figure 4:
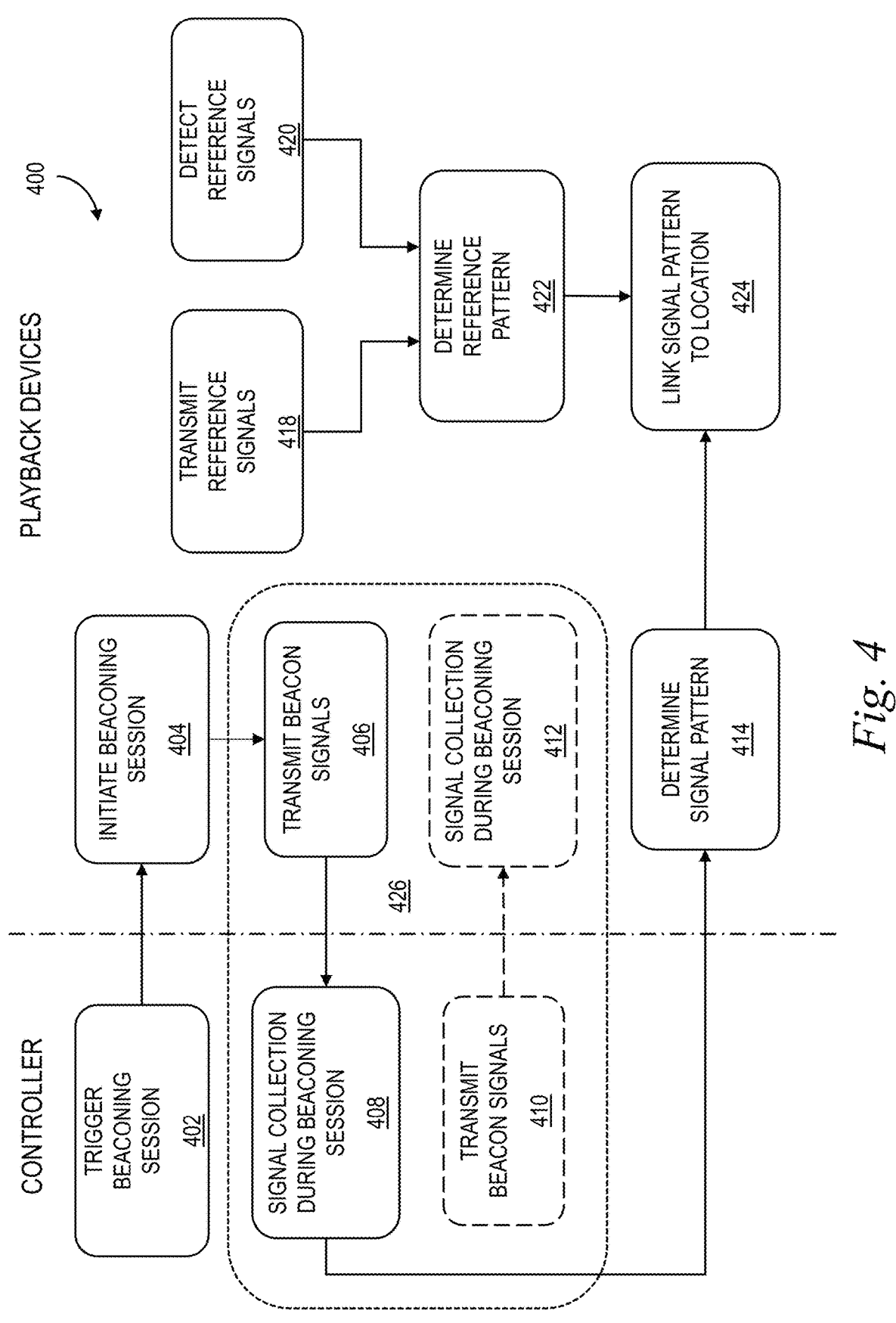
FIG. 4 is a flow diagram of one example of a signaling process according to aspects of the disclosed technology.

Referring to FIG. 4, there is illustrated a flow diagram for one example of a signaling process 400 in accord with various embodiments. In this example, the process 400 is performed using the controller 330 and one or more playback devices 310. However, in other examples, at least some of the functions associated with the controller 330 may be performed by another portable device, such as a portable playback device, for example. In some examples, certain aspects of the process 400 can be performed at the controller 330 and/or at one or more playback devices 310 in the MPS 100. Examples of the process 400 can be distributed across multiple devices, as indicated in FIG. 4. In several embodiments, a coordinator device is designated to collect and store signal information from other playback devices and/or from the controller 330. Coordinator devices can be selected from the available devices of the MPS 100 based on one or more of several factors, including (but not limited to) RSSI of signals received from the controller 330 at the playback devices 310, frequency of use, device specifications (e.g., number of processor cores, processor clock speed, processor cache size, non-volatile memory size, volatile memory size, etc.). For example, a particular playback device 310 can be selected as a coordinator device based on how long its processor has been idle, so as not to interfere with the operation of any other devices during playback (e.g., selecting the playback device 310c located in the second bedroom 301d that is used infrequently). In certain embodiments, the coordinator device may be the controller 330.

At operation 402, the controller 330 triggers a beaconing session 426. In some instances, the controller 330 may trigger the beaconing session 426 in response to a user input, such as the user interacting with the controller 300 to start or alter a playback session on one or more devices, for example. In other instances, the controller 330 can be configured to periodically trigger a beaconing session, independent of any user action. Further, as described below, in some instances, a portable playback device can trigger a beaconing session in response to detecting that it has been moved within the environment 300. In triggering the beaconing session 426, the controller 330 (or portable playback device) may direct the coordinator device to initiate the beaconing session 426.

At operation 404, the coordinator device initiates the beaconing session 426. In other examples, the controller 330 may initiate the beaconing session 426, rather than instructing the coordinator device to do so. In some examples, initiating the beaconing session 426 includes broadcasting, by the coordinator device (or the controller 330), a wireless signal containing a beaconing instruction. Based on detecting the wireless signal, participating devices engage in the beaconing session 426. Participating devices may be all or some of the playback devices 310 in the environment 300. In some examples, participating devices may include all the playback devices 310 that detect the wireless signal containing the beaconing instruction and that have the capability to transmit beacon signals 304. Accordingly, the group of participating devices may depend on various factors, including operational status of the individual playback devices 310 (e.g., whether or not a playback device is in a sleep mode), signaling capability of the individual playback devices 310 (e.g., whether or not a playback device has a BLE radio), locations of the playback devices 310 within the environment 300, and/or the arrangement of the environment 300 (e.g., some playback devices may be positioned too far away from the coordinator device and/or the controller 330 to participate in the beaconing session 426). In some examples, the beaconing session 426 corresponds to a predetermined time period, as described further below.

At operation 406, each of the participating playback devices 310 transmits one or more beacon signals 304. In some examples, the beacon signals are BLE signals containing BLE advertisement packets. Accordingly, the participating devices may each include a wireless communication interface that includes a BLE radio, as described above.

At operation 408, the controller 308 collects beacon signals 304 emitted by the participating playback devices 310. The controller 330 may not collect beacon signals 304 from all the participating playback devices 310. For example, some participating playback devices 310 may be positioned too far away from the controller 330, or there may be obstructions between the controller 330 and a participating playback device, such that the controller 330 does not receive some or all beacon signals from one or more participating devices.

In some examples, the playback devices 310 may transmit multiple beacon signals 304 during the beaconing session 426. Thus, at operation 408, the controller 330 may detect far more beacon signals 304 than there are transmitting playback devices 310. Each of the collected beacon signals 304 may have a different signal strength, e.g., a different RSSI value, based on various factors, including the distance between the controller 330 and the source playback device 310 of the particular beacon signal 304 and the quantity and/or nature (e.g., material, thickness, etc.) of any obstacles in the path of the beacon signal 304. Accordingly, in some examples, the controller 330 may determine various characteristics of the beacon signals 304 as well as signal statistics during the beaconing session. For example, the controller 330 may determine the RSSI value for each beacon signal, the median signal strength (or RSSI value) for the group of collected beacon signals 304, the standard deviation of the signal strength for each collected beacon signal relative to the median signal strength, and a count of the total number of beacon signals 304 detected during the beaconing session 426. At operation 414, this signal data is used to construct a signal pattern corresponding to the location of the controller 330 during the beaconing session 426, as described further below. The signal data may also be provided as input data to a machine learning personalization system, as also described further below.

In examples, each of the beacon signals 304 includes identification information that identifies the particular playback device 310 that is the source of the respective beacon signal 304. For example, the beacon signals 304 may each include a sequence of tones and/or a transmission identifier. In some examples, the sequence of tones is specific for each playback device 310 and can therefore be used to identify the playback device that is the source of the beacon signal 304. In other examples, the transmission identifier identifies the playback device 310 that is the source of the beacon signal 304. In such examples, the controller 330 may group the detected beacon signals according to the source playback device from which they originated, and determine signal statistics for each group of beacon signals.

As described above, in some examples, signal collection (at operation 408) during the beaconing session 426 is performed only by the controller 330 (passive signal collection), as in the example of FIG. 3B. In other examples, as described above with reference to FIG. 3C, the participating playback devices can also collect beacon signals 304 emitted by the controller 330. Accordingly, at operation 410, the controller 330 may transmit one or more beacon signals 304, and at operation 412, some or all of the participating playback devices 310 collect the beacon signals 304 emitted by the controller 330. In such examples, each participating device, and the controller 330, is able to transmit and receive the beacon signals 304. Similar to the participating devices, the controller 330 may also include a wireless communication interface that allows for reception and optionally also transmission of BLE beacon signals. In some examples, the controller 330 emits multiple beacon signals during a given beaconing session 426. Accordingly, the playback device(s) 310 may determine RSSI values for each collected beacon signal, along with signal statistics, such as the median RSSI value for the group of collected beacon signals, the standard deviation of the signal strength for each collected beacon signal relative to the median signal strength, and a count of the total number of beacon signals detected during the beaconing session, for example. The signal measurement data collected by the one or more playback devices 310 can be combined with the signal measurement data collected by the controller 330 and the combined data sets can be used at operation 414 to develop the signal pattern, as described further below.

In some examples, the wireless signal transmitted to initiate the beaconing session 426 includes timing/synchronization information such that all the participating playback devices 310 and the controller 330 conduct the beaconing session 426 during substantially the same overlapping time window. Operations 406/410 (transmitting beacon signals 304) and operations 408/412 (detecting beacon signals 304) may be performed together during the beaconing session 426. In some examples, signaling during the beaconing session 426 is accomplished with standard HCl commands from the BLUETOOTH 5.3 core specification. However, in other examples, other signaling methodologies can be used. In examples, the signaling approach used during the beaconing session 426 does not require meticulous scheduling of the individual transmissions of beacon signals 304 from the participating devices, but rather just an alignment of the overall time window corresponding to the beaconing session 426. This is because BLE transmitters are capable of switching between transmit and receive modes quickly and apply small random offsets (e.g., 0-10 ms) to each scheduled transmit time. Furthermore, the beacon signals 304 can be made to be very short transmissions. Accordingly, the random variation and short transmission time can be leveraged to avoid signal collisions during the beaconing session 426.

The time duration of the beaconing session 426 may be selected based on one or more factors or considerations. As discussed above, in some examples, signal measurement data derived from the collected beacon signals 304 includes statistical information, such as median RSSI values and standard deviations. Accordingly, one factor that can be considered in selecting the time duration of the beaconing session 426 is the time needed to collect a sufficient number of beacon signals 304 at the controller 330 and/or the participating playback devices 310 to be able to determine meaningful statistics for the group of collected beacon signals. In some environments, the signal paths may be subject to large degrees of attenuation (due to distance or obstruction), and as a result, fewer beacon signals 304 may be detected by the listening devices. This may affect the ability to accurately measure the signal strength distribution, therefore, it may be advantageous to select a sufficiently long time window for the beaconing session 426 that allows each listening device to obtain a statistically relevant data set. Another factor that may be considered is minimizing the time that the listening/collection event(s) occurring at operations 408 and/or 412 may impede device performance when the BLE antenna is shared with other components/functionality (e.g., with a WI-FI radio). Some playback devices 310 may include a dedicated BLE antenna, and therefore, this factor may not be a consideration for such playback devices. Another factor that may be considered is selecting a time duration sufficiently short such that movement of the controller 330 during the beaconing session 426 is likely to be minimal (e.g., a few milliseconds or up to one or two seconds). This may allow the signal pattern produced from the beaconing session 426 to be reliably linked to a particular position/location of the controller 330. Another factor may be the rate at which the BLE beacon signals 304 can be transmitted by the controller 330 and/or playback devices 310. In some examples, BLE beacon signals may be transmitted at a rate of approximately 10 Hz. In some examples, the time duration of the beaconing session 426 is approximately one second. In examples, an approximately 10 Hz sample rate with a one second beaconing time window allows for approximately 10 transmissions from the controller 330 and a similar number from each of the participating devices, which can then be detected by the controller 330.

Figure 5:
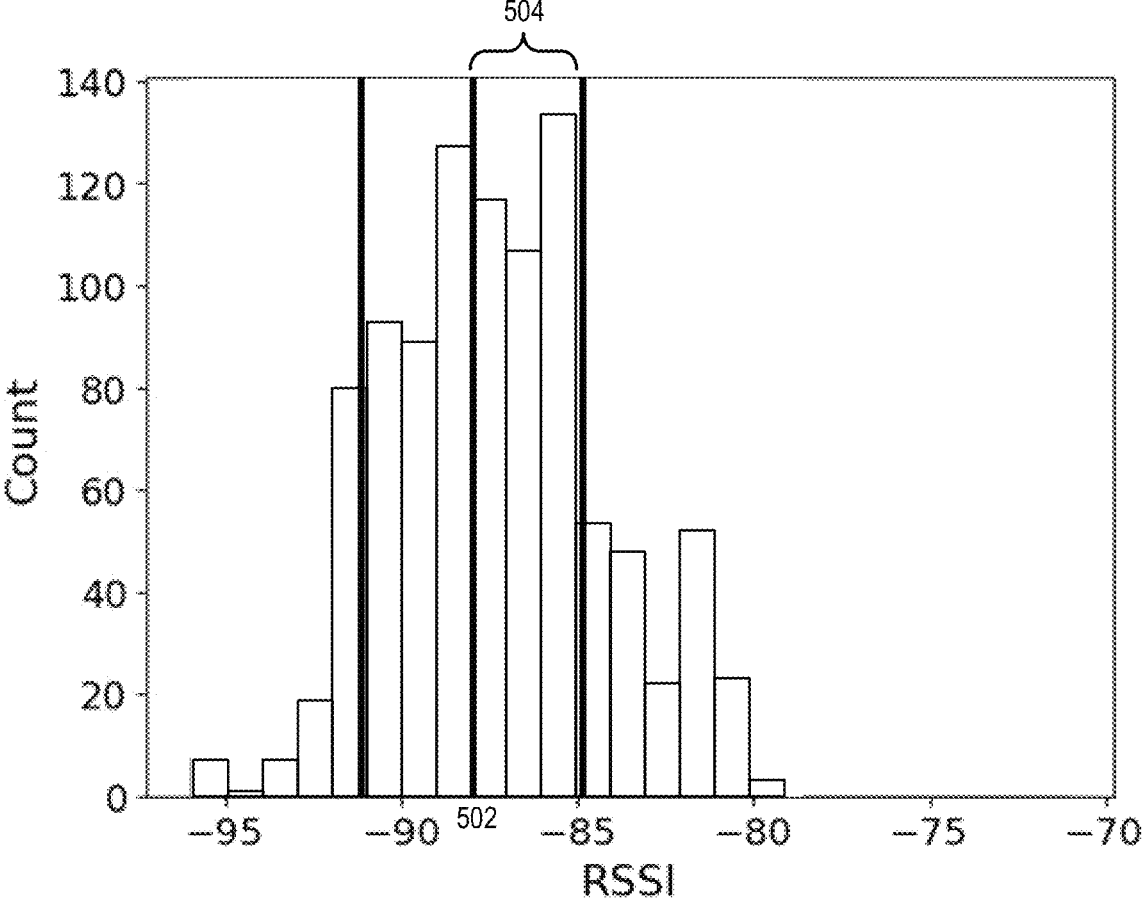
FIG. 5 is a graph showing an example of a signal distribution according to aspects of the disclosed technology.

As described above, during the beaconing session 426, the controller 330 (at operation 408) and/or the participating playback devices 310 (at operation 412) can acquire various signal measurements based on the collected beacon signals 304 at each individual device. FIG. 5 illustrates an example of a BLE signal distribution from one playback device 310 during the beaconing session 426. As described above, in certain examples, each BLE beacon signal 304 includes an advertisement packet to read its RSSI value. Thus, the "listening" device (whether the controller 330 or a participating playback device 310) may obtain the RSSI values for each detected beacon signal 304. In some examples, the signal measurements include the RSSI value of each received beacon signal 304, the median signal strength (or RSSI value) 502 for the group of beacon signals 304 collected during the beaconing session 426, and the standard deviation 504 of the signal strength (e.g., RSSI values) over the group of collected beacon signals. Each listening device may also record a count of the total number of beacon signals 304 it detects during the beaconing session 426.

Referring again to FIG. 4, at operation 414, based on the information collected and determined during the beaconing session 426, a signal pattern corresponding to that beaconing session, and therefore to the location of the controller 330 during the beaconing session, can be determined. In some examples, a computation device collects reporting signals from the controller 330 and each of the participating playback devices 310 to acquire the signal measurements/data used to produce the signal pattern at operation 414. In some examples, the computation device is the same playback device 310 that acts as the coordinator device that initiates the beaconing session at operation 404. In other examples, the coordination device and the computation device can be different playback devices 310. In other examples, the controller 330 can be the computation device. The reporting signals may include the determined signal statistics discussed above (e.g., median RSSI value, standard deviation of signal strength, and count of detected beacon signals) and optionally the read RSSI values of each detected beacon signal 304. In addition, the reporting signals may each include identification information as to the playback device 310 (or controller 330) that is providing the reporting signal. In the case of the controller 330, which potentially receives beacon signals 304 from multiple playback devices 310, the reporting signal from the controller 330 may include playback device identity information corresponding to each individual beacon signal 304 or to sets of beacon signals received from the same playback device 310. As discussed above, each beacon signal 304 may include a transmission identifier and/or may comprise an individual sequence of tones or some other distinguishing characteristic that identifies the source of that beacon signal. Accordingly, this identification information may be included in the reporting signals provided from the controller 330 to the computation device at operation 414. The reporting signal may further include an identifier of the playback device that is the source of the reporting signal. The computation device can store the acquired information extracted from the reporting signals in a matrix, array, or other data structure in a memory (e.g., memory 112b) or other computer/machine readable storage device that is part of the computation device.

Thus, in some examples, the signal pattern produced at operation 414 includes both signal information (e.g., RSSI values and signal statistics as described above) and playback device information (e.g., which playback devices 310 contributed beacon signals 304 to the pattern). For any given beaconing session 426, the signal pattern developed at operation 414 may be unique to, or at least strongly tied to or dependent on, the corresponding location of the controller 330 during the beaconing session. For example, the signal pattern that may be developed for the controller 330 in location 1 as shown in FIG. 3B may be identifiably different from a signal pattern that may be developed for the controller 330 in location 2 as shown in FIG. 3C or location 3 as shown in FIG. 3D.

Figure 6A:
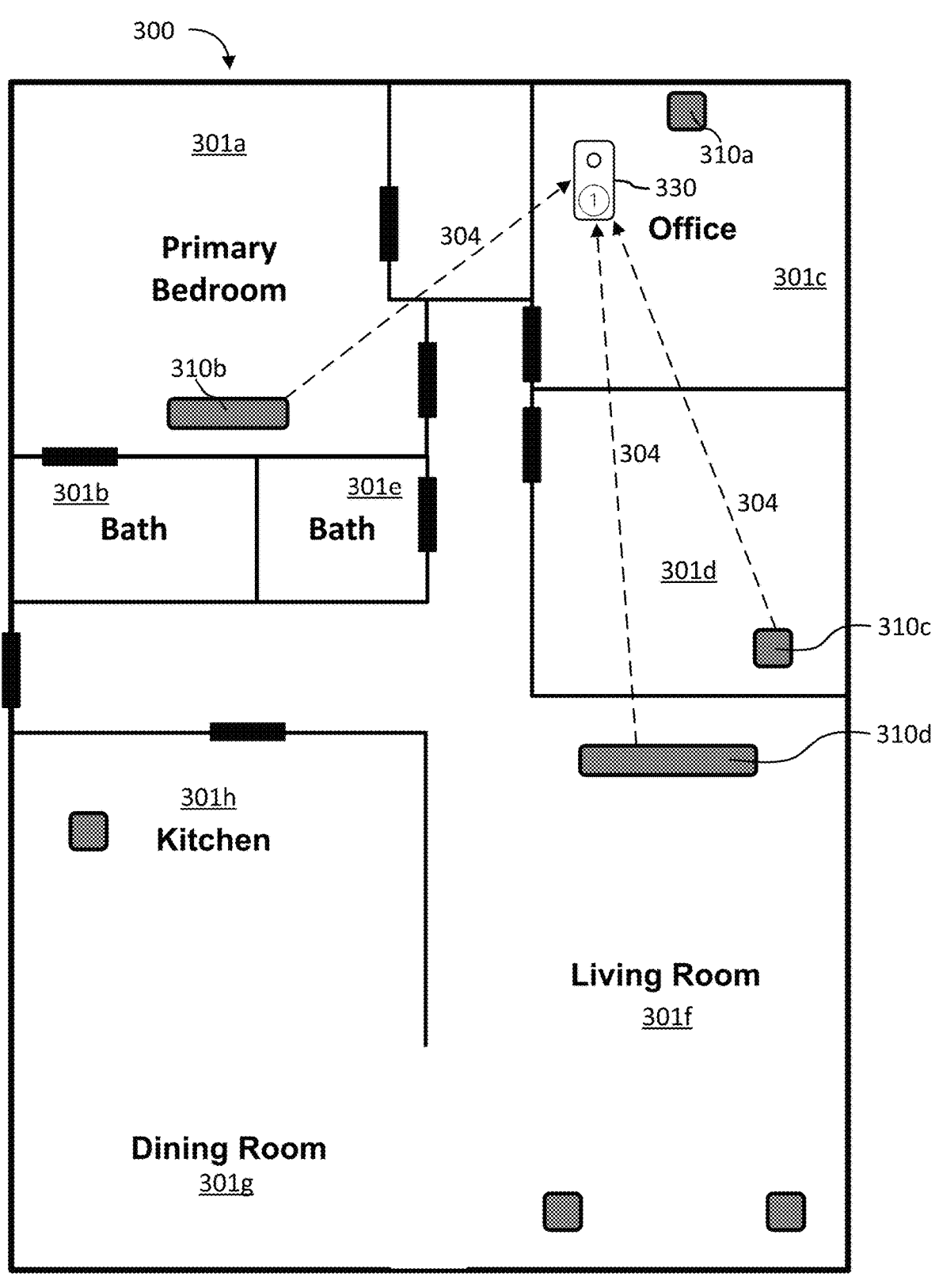
FIG. 6A is a plan view of another example of the environment of FIGS. 3A-D including a media playback system according to aspects of the disclosed technology.
Figure 6B:
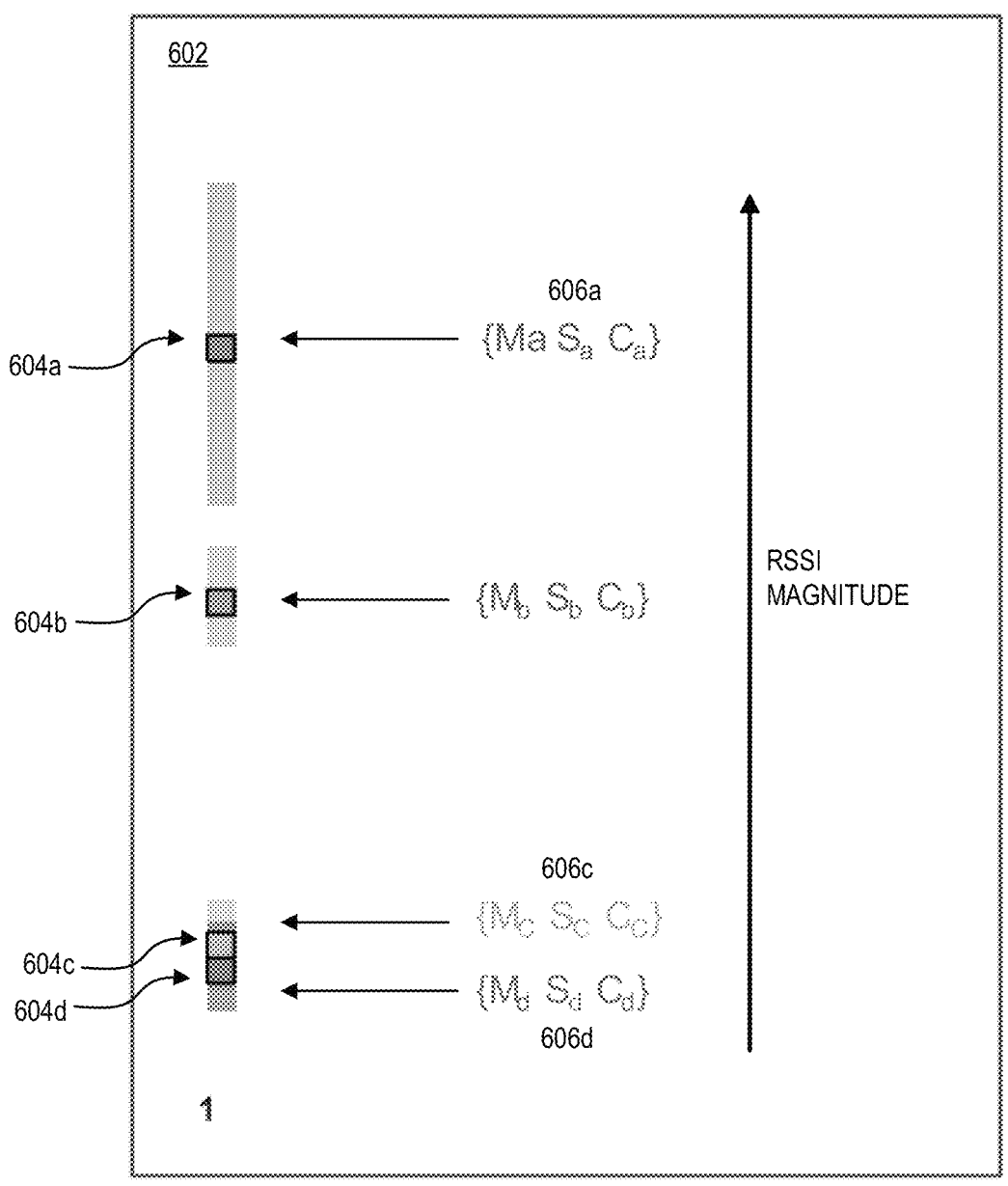
FIG. 6B is a graph showing an example of a signal pattern corresponding to a location in the environment of FIG. 6A.

An example of a signal pattern is described with reference to FIGS. 6A and 6B. FIG. 6A shows an example of the environment 300 in which the playback devices 310a-d are participating devices in a beaconing session with the controller 330 positioned at location 1. FIG. 6B illustrates an example of a corresponding signal pattern 602. In this example, the signal pattern 602 includes signal measurement sets 604a, 604b, 604c, and 604d corresponding to the beacon signals detected from each of the four participating devices, namely, playback devices 310a-d in this example. Each signal measurement set 604a-d also includes a respective signal data set 606a-d corresponding to the information discussed above, namely the median signal strength (Mi), the spread, or standard deviation, Si, and the count, Ci, of the total number of beacon signals collected by the respective device during the beaconing session 426 (i=a, b, c, d).

As described above, in certain examples, the beacon signals 304 can also be transmitted by the controller 330 and detected by the playback devices 310a-d. Accordingly, each playback device 310a-d may produce signal data based on the set of beacon signals emitted by the controller 330 that it detects. Accordingly, in some examples, the signal measurement sets 604a-d, and the corresponding signal data sets 606a-d, may be based on a combination of the signal data accumulated from beacon signals 304 emitted by the respective playback device 310a-d and detected at the controller 330 and signal data accumulated from beacon signals emitted by the controller 330 and detected at the same respective playback device 310a-d. Such two-way signal exchange and corresponding combination of the signal data may add robustness to the signal pattern generation process.

In some examples, each reporting signal sent to the computation device at operation 414 only includes the data set 606 corresponding to each of beacon signals 304. Thus, transmitting the reporting signals to the computation device can occupy very little time and add very little latency to the process. Accordingly, the bandwidth of the BLE radios may not need to support the size of a full dataset, rather just the small content of the reporting signals. In some examples, the reporting signals are not sent via BLE, but are instead transmitted via a WI-FI channel in a network that communicatively couples the playback devices 310 and the controller 330 (e.g., the network 104 of FIG. 1B).

Figure 7A:
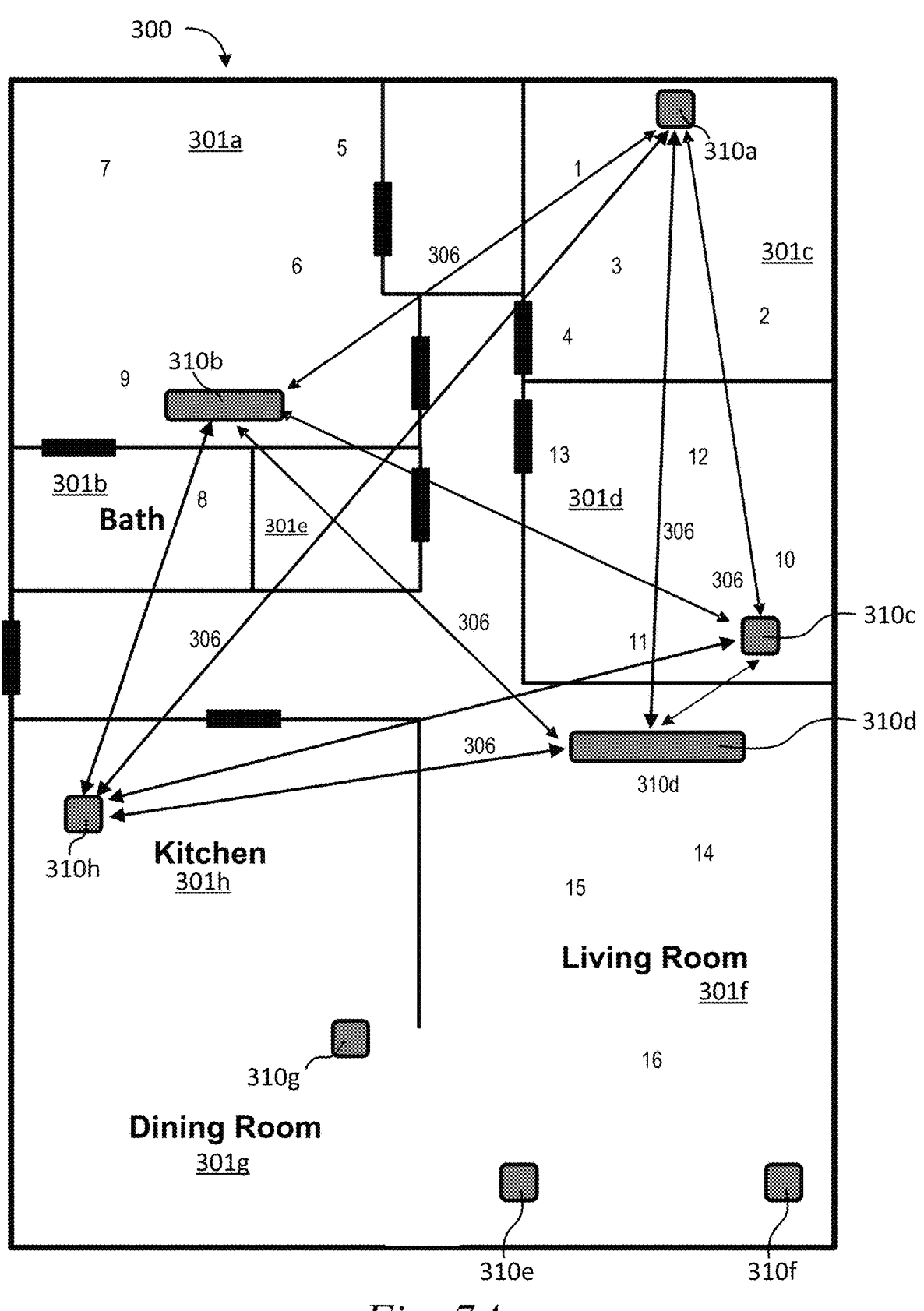
FIG. 7A is a plan view of one example of the environment of FIG. 3A including a media playback system according to aspects of the disclosed technology.
Figure 7B:
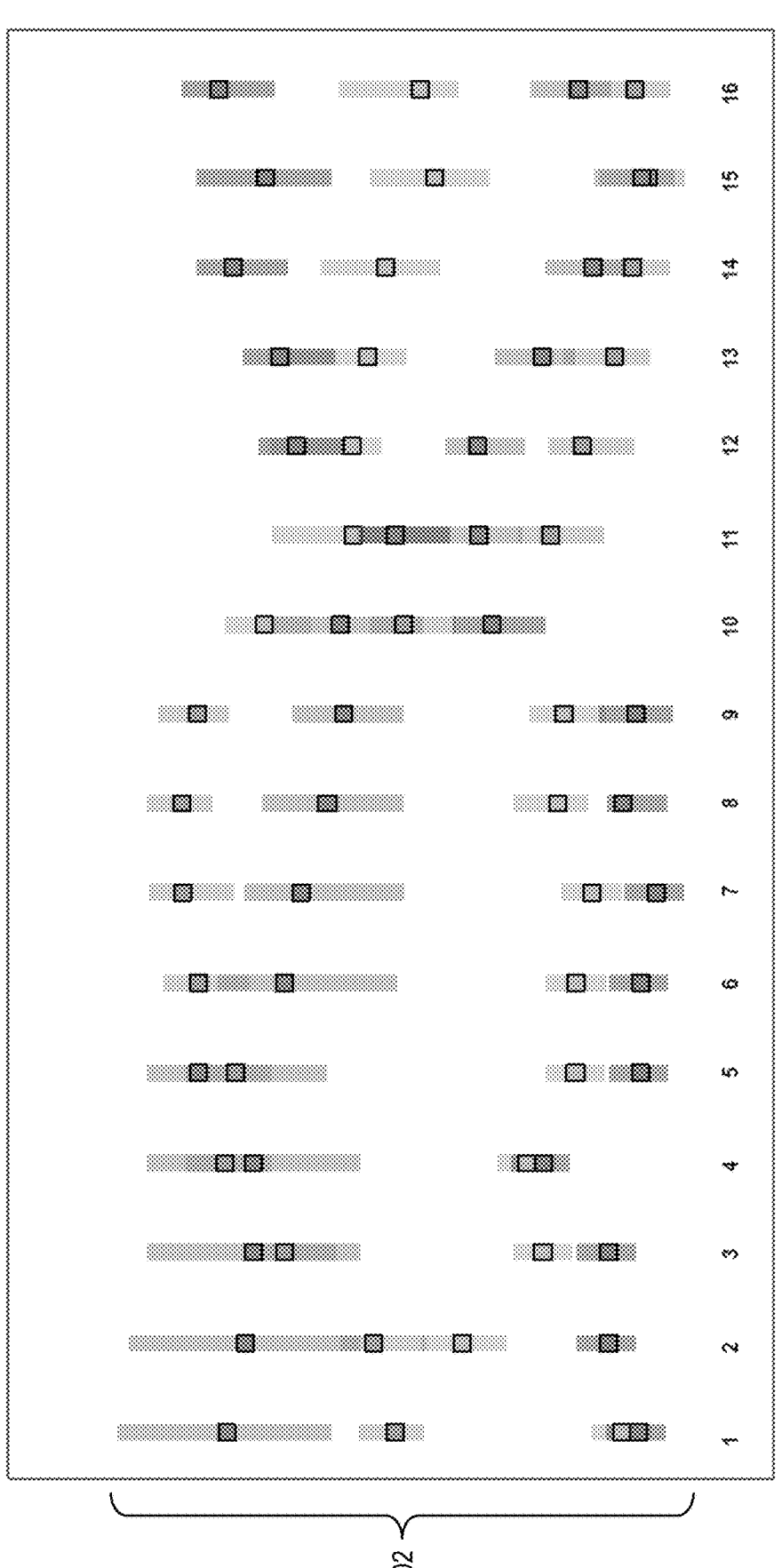
FIG. 7B is a graph showing examples of labeled signal patterns corresponding to locations in the environment of FIG. 7A.

According to certain examples, as the controller 330 is moved around the environment 300, beaconing sessions 426 can be performed while the controller 330 is in different locations, so as to acquire signal patterns 602 at numerous locations throughout the environment 300. An example of sixteen different locations, and corresponding signal patterns 602, is illustrated in FIGS. 7A and 7B. As discussed above, in some examples, the controller 330 can initiate beaconing sessions periodically, such that the signal data used to produce the signal patterns 602 is acquired automatically over time. An advantage of using the controller 330 to perform beaconing sessions 426 is that a user may naturally move around the environment 300 while carrying the controller (e.g., their phone or tablet). Accordingly, the signal patterns 602 that can be used to drive location-based personalization can be acquired without any specific user engagement (e.g., without requiring the user to perform specific calibration or set-up tasks for personalization). Similarly, in examples in which the controller 330 triggers a beaconing session based on user interaction (e.g., initiating a playback session), the user interaction is directed to another activity rather than being specific to performing beaconing to achieve personalization. In certain examples, this user interaction can be used to label the signal data (e.g., the data describing the signal pattern 602) corresponding to the beaconing session to produce labeled data that can be used by the machine learning personalization service, as described further below. In this manner, the signal pattern 602 can be tied not only to a particular location but also to a particular device activity (e.g., a particular target device for interaction, a certain grouping formation, etc.).

Referring again to FIG. 4, in certain examples, in addition to producing the signal patterns 602 based on the beacon signals 304, the system can be configured to generate reference patterns based on the reference signals 306 (e.g., as shown in FIG. 3D). Accordingly, at operation 418, some or all of the playback devices 310 transmit reference signals that can be detected, at operation 420, by some or all of the other playback devices 310. In some examples, the reference signals 306 are BLE signals, similar to or the same as the beacon signals 304. In other examples, a different signaling technology or protocol can be used for transmission and reception of the reference signals 306. For example, the reference signals 306 may be acoustic signals or ultrasound signals. At operation 422, a reference pattern is produced based on the reference signals 306 exchanged among the playback devices 310. FIG. 7A shows an example of reference signals 306 transmitted between the playback devices 310a-d.

In some examples, the reference signals 306 are transmitted and detected (at operations 418 and 420) and the reference pattern is produced at operation 422 during the beaconing session 426 or during a time overlapping with the beaconing session. In other examples, the reference signals 306 can be transmitted and received, and the reference pattern can be produced, independent of the beaconing session. Further, the reference signals 306 can be transmitted and received (at operations 418 and 420) by one or more playback devices 310 that may not be participating in a concurrent beaconing session 426.

As described above, the reference pattern produced at operation 422 can be used for various purposes, including providing a baseline or reference framework for comparing the signal patterns 602. In some examples, the reference pattern can be used to "localize" the signal patterns 602, such that the signal patterns can be linked to particular relative locations within the environment 300. In other words, the reference pattern can be used to identify the locations (e.g., locations 1-16 of FIG. 7B) in terms of relative proximity to one or more of the playback devices 310 in the environment 300.

As described above, in certain examples, contextual location information, such as room detection, can also (or alternatively) be applied to identify the locations in terms of relative positioning within the environment 300. For example, acoustic or ultrasonic signaling can be used for presence/room detection, as described above with reference to FIG. 2. This information, optionally in combination with the reference pattern, can be used to localize the locations, and therefore the associated signal patterns. Accordingly, the signal patterns 602 can be tied to specific relative locations within the environment. This can allow for automatic location-based behavior to be implemented, as described further below.

Figure 7C:
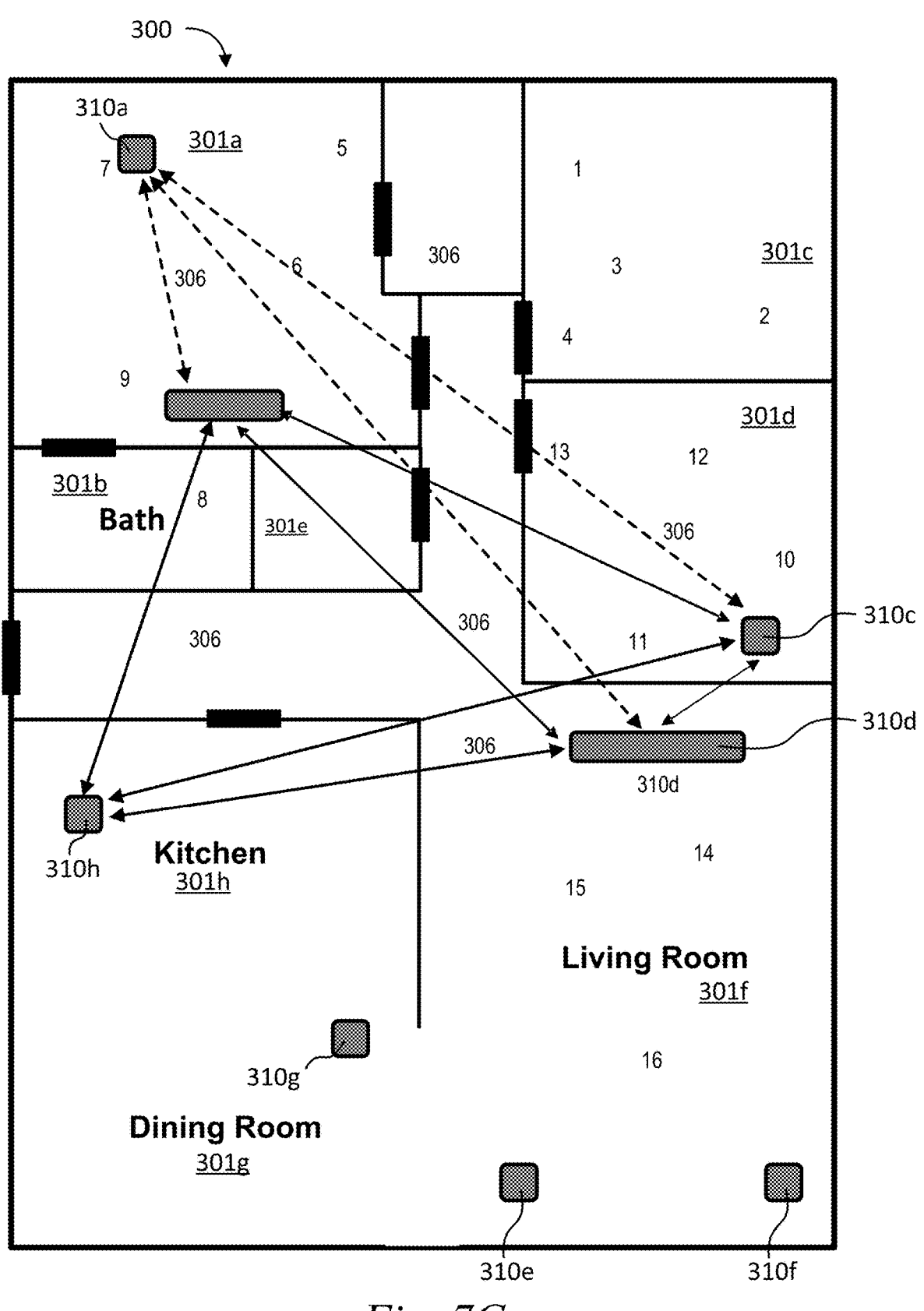
FIG. 7C is a plan view of another example of the environment and media playback system of FIG. 7A.

Changes in the reference pattern may also indicate a significant change in the MPS 100 deployed in the environment 300, such as movement of a portable playback device 310 from one location to another, or the addition of a new playback device. FIG. 7C illustrates an example in which the playback device 310a has been moved from the office 301c into the master bedroom 301a. As a result, and as may be seen by comparing FIG. 7A with FIG. 7C, the reference pattern produced from the reference signals 306 may be substantially different. In some instances, this information can be used by the machine learning personalization service to update certain location-based personalization settings that may be impacted by the change in the MPS 100, as described further below.

In other instances, a change in the reference pattern that indicates movement of a portable playback device 310 can be used to trigger a beaconing session to acquire a signal pattern associated with the location of the relocated portable playback device. For example, the portable playback device, or another network device in the MPS 100, may determine movement of the portable playback device based on the reference signals 306. In such instances, during a beaconing session, the portable playback device may perform the activities described above with respect to the controller 330. For example, in this instance, a beaconing session includes detecting the beacon signals 304 with the portable playback device, rather than with the controller 330, and optionally transmitting beacon signals from portable playback device for detection by other participating playback devices. In such examples, the controller 330 need not participate in such a beaconing session at all. Once a signal pattern has been produced for the portable playback device, the signal pattern can be compared with previously acquired signal patterns to localize the portable playback device. For example, referring to FIG. 7C, in this instance, the playback device 310a has moved to a location proximate to location 7 for which a signal pattern has been acquired (as shown in FIG. 7B). Accordingly, based on similarity (within some predetermined thresholds/tolerance) between the signal pattern acquired for the playback device 310a during a new beaconing session, as described above, and the signal pattern previously associated with location 7, it may be determined that the playback device 310a is now at or near location 7. Accordingly, personalization settings that may have been determined and associated with location 7 can be transferred to the playback device 310a, as described further below.

As discussed above, some of the playback devices 310 may be portable devices that are frequently moved, whereas others are stationary devices that rarely move. Accordingly, in some examples, one or more stationary devices can be designated as "anchor" devices and an anchor reference pattern can be established based on only those anchor devices. In some instances, anchor devices can be designated by device information associated with device identifiers stored by the MPS 100. For example, the device information may indicate whether a particular playback device 310 is a stationary or portable device, and only stationary devices maybe designated as anchor devices. In another example, based on consistency in reference patterns collected from among two or more playback devices over time, some or all of those playback devices can be designated as anchor devices. In the scenario of FIGS. 7A and 7C, for example, it can be seen that the reference pattern among playback devices 310b-d and 310h (indicated with solid lines) remains the same, despite movement of the playback device 310a, whereas aspects of the reference pattern associated with the playback device 310a (indicated with dashed lines) have changed. Using one or more anchor reference patterns established among anchor devices can help the system to identify movement of portable playback devices and localize the portable playback devices within the environment.

As described above, according to certain examples, the MPS 100 can be configured to implement a personalization service that incorporates various machine learning approaches to personalize one or more attributes of the MPS, including automated target device prediction, personalized volume and/or playlist settings, power management schedules, etc. The personalization service can be implemented by one or more of the playback devices 310 and/or the controller 330, individually or in combination. In some examples, personalization functionality can be accomplished using a model predictive controller that runs one or more parameterized machine learning models.

Figure 8:
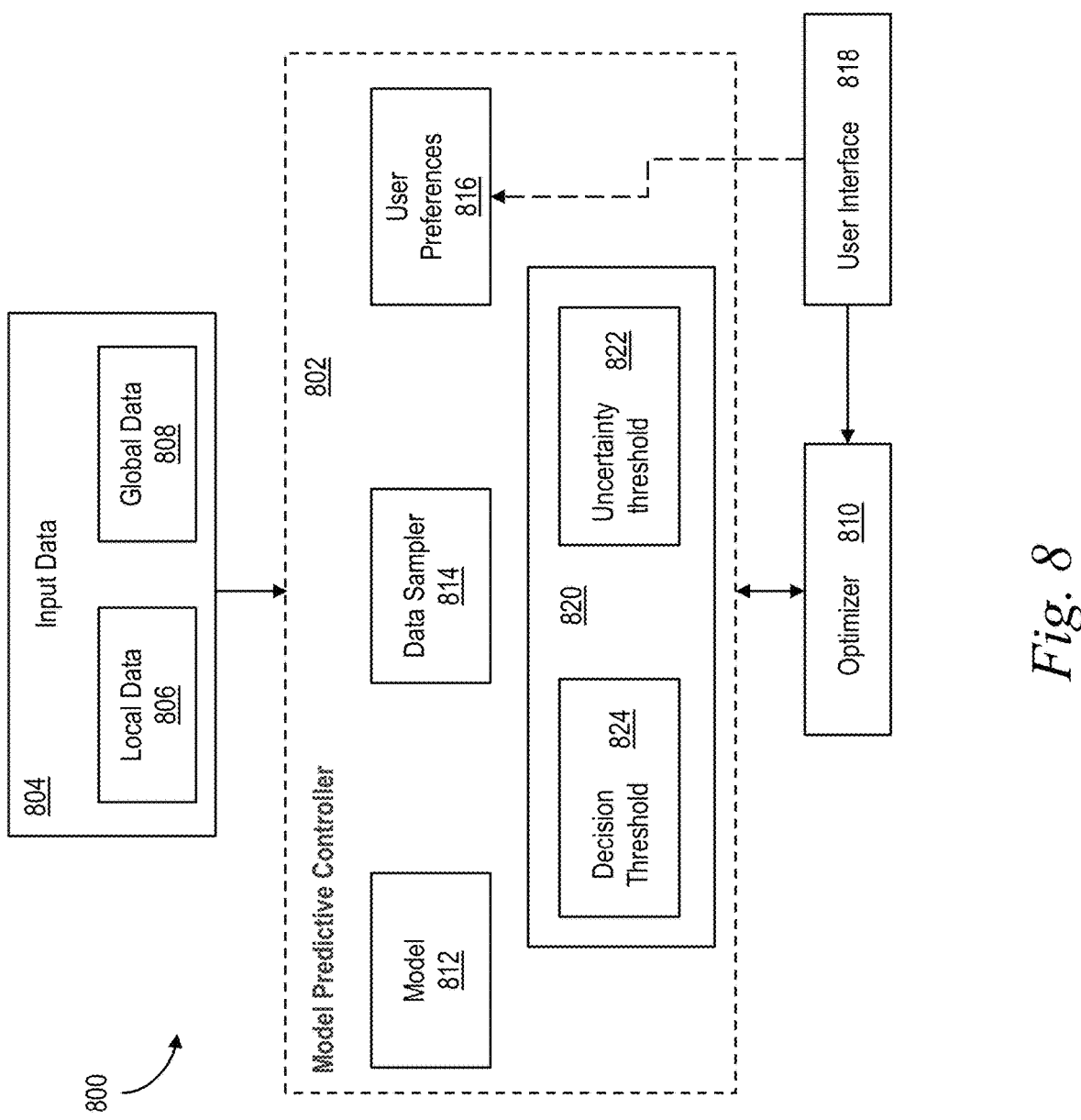
FIG. 8 is a block diagram of one example of a machine learning personalization system according to aspects of the disclosed technology.

FIG. 8 illustrates an example of a machine learning system 800 that can be used to implement various personalization functionality. In this example, a model predictive controller 802 operates on input data 804 and its operation is controlled by an optimizer 810. The model predictive controller (MPC) 802 includes a model 812, which may be a parameterized machine learning model, as discussed above. The MPC 802 further includes a data sampler 814, user preferences 816, and a confidence element 820. The confidence element 820 may apply two threshold values, namely an uncertainty threshold 822 and a decision threshold 824, each of which is discussed further below. The confidence element 820 allows the system to accommodate uncertainty in the prediction (e.g., by using confidence indicators, as described below), which can lead to improved performance. The system 800 may be implemented, in whole or in part, on one or more network devices (e.g., playback devices 310 or controller 330) within the MPS 100, or may be implemented, in whole or in part, on a cloud network device 102, for example. The system 800 may be implemented in software or using any combination of hardware and software capable of performing the functions disclosed herein.

In examples, the model predictive controller 802 runs the model 812 based on parameters associated with one or more features extracted from the input data 804 to produce a personalization result or recommendation, such as a predicted target device for a given interaction or predicted grouping arrangement, for example. The input data 804 can comprise any data which is used to correlate user behavior with a specific action and target device. The input data 804 can include "local" data 806 that is data collected from a specific environment 300. In some examples, this local data 806 includes the signal measurement data, or the signal data sets 606, collected by the controller 330 and/or one or more playback devices 310 during beaconing sessions. The local data 806 may further include activity information and target device identity associated with a signal pattern produced for each beaconing session. This information can be collected via user input and/or feedback that can be collected concurrently with a beaconing session 426. For example, if a user operates the controller 330 to start a playback session on a particular playback device 310, this action may trigger a beaconing session (as described above) and information about the activity (e.g., time of day that the playback session was initiated, audio content and/or audio source selected, etc.) as well as the target device (which playback device(s) 310 did the user select) can be stored by the computation device and associated with the particular signal pattern 602 produced for the beaconing session. Thus, the activity information and/or target device identity can be used to "label" the signal pattern data, such that the system 800 can learn over time particular routines of activity and/or target devices correlated with the locations that correspond to individual signal patterns 602.

In some examples, particularly to assist the system 800 when little or no local data 806 is available (e.g., when the system 800 is first activated or re-activated after a long period of inactivity), the input data 804 may include some "global" data 808 that is data collected from outside sources, such as a group of one or more other environments 300 or averaged trends from multiple environments 300, for example.

In examples, the data sampler 814 intakes the input data 804 and extracts one or more input features to be used by the model 812, as described further below. In some examples in which the input data 804 includes both local data 806 and global data 808, the data sampler 814 determines how to combine the local and global data. In some examples, this operation of the data sampler 814 can be modified by a "proportion" hyperparameter that determines the mix, or by a more sophisticated sampling regime, for example.

The model 812 uses the input data 804 to generate a set of parameters which yield a generalized function capable of predicting one or more particular output values (e.g., the identity of a target device) based on new input data 804. Parameters are variables that "belong" to the model 812 in that the trained model is represented by the model parameters. In contrast, hyperparameters are higher-level variables that affect the learning process and, thus, the values of the model parameters of the trained model 812. In some examples, training the model 812 involves choosing hyperparameters that the learning process uses to generate parameters that correctly map the input features (independent variables) to the labels (dependent variables) such that the model 812 produces predictions (e.g., target device identities) with reasonable accuracy.

In the example illustrated in FIG. 8, the system 800 includes the optimizer 810 that operates based on one or more hyperparameters to optimize performance of the MPC 802. In some examples, the optimizer 810 selects hyperparameters for use during training of the model 812. Hyperparameters may include variables that determine characteristics such as an architecture of the model 812 (e.g., kernel selection or type of model (e.g., linear regression, Gaussian process, logistic regression, gradient boosted tree classifier, etc.), kernel size, etc.) how the model 812 is applied, the mix of local and/or global input data used, and/or variables that affect an optimization process used by the optimizer 810. A hyperparameter can, for example, take the form of a single continuous scalar variable or a discrete categorical variable (e.g., which kernel to use). Selection of hyperparameters has a significant impact on the performance (e.g., accuracy of predictions) of the trained model 812. Accordingly, in some examples, the optimizer 810 applies an optimization process to select the best hyperparameters for training the model 812. In some examples, this optimization process involves testing the performance of the system 800 on a validation dataset and adjusting the hyperparameters to produce an optimal result. Thus, the optimizer 810 may select certain hyperparameters, train a first model 812, and test the first model 812 using the validation data. The optimizer 810 may then tune the hyperparameters, train a second model 812, test the second model 812 using the validation data, and compare the performance to determine which hyperparameters produced a better result in the trained models. This process can be repeated to find optimal hyperparameters. In some examples, the optimizer 810 may use a grid search involving a field of combinations of hyperparameter values. In other examples, the optimizer 810 may apply a gradient descent optimization or a gradient-free optimization method, such as Bayesian optimization, or some combination thereof. As noted above, in some examples, the choice of optimization process can be a hyperparameter itself.

Thus, hyperparameters are "external" to the model 812 since they cannot be changed by the model during training, although they are tuned by the optimizer 810 to control the training of the model 812. As described above, a hyperparameter selected by the optimizer 810 can include a set of model parameters, as well as values that define the model architecture itself. In contrast, the model parameters are internal to the model 812 and their values are learned or estimated based on the input data 804 during training as the model 812 tries to learn the mapping between the input features and the labels. In some examples, training of the model 812 begins with the parameter values set to some initial default values (e.g., random values or set to zeros), and these initial values are updated as training/learning progresses under control of the optimizer 810, as described above.

According to certain examples, the model 812 is configured to find the probability, P, of a label, y, given a set of features, x, with parameters, $\theta$, for each $i^{th}$ measurement according to the function:

$$P\left(y^{(i)} = 1 \mid x^{(i)}; \theta\right) = \sigma\left(\theta_0 x_0^{(i)} + \theta_1 x_1^{(i)} + \dots + \theta_N x_N^{(i)}\right) \tag{F1}$$

In the above function, F1, $\sigma$ is a logic cost function that is defined by the model architecture. In some examples, the model 812 is selected to be a logistic regression model, and accordingly, $\sigma$ is given by:

$$\sigma\left(\theta^T x^{(i)}\right) = \frac{1}{1 + e^{-\theta^T x^{(i)}}} \tag{F2}$$

In this example, there are N features (x) each with a parameter ($\theta$) that is fit through minimization of the cost function. In other examples, the model 812 uses a different kernel, such as a Gaussian Process kernel, in which case the cost function is different from that described by F2. As discussed above, the kernel used by the model 812 may be a hyperparameter that is selected by the optimizer 810, possibly depending on the type of personalization that the model 812 is learning to predict. For example, certain types of personalization, such as learned device targeting, for example, may be well suited to the use of a logistic regression model, whereas other types of personalization, such as a personalized volume prediction, for example, may be well suited to a different type of model, such as a Gaussian Process model, for example. For learned device targeting, and potentially other personalization settings, a logistic regression model may offer advantages due to its low computational complexity and ability to be trained on a relatively small training data set.

Still referring to FIG. 8, as discussed above, in some examples, the MPC 802 incorporates uncertainty through the use of the confidence element 820. In the above-discussed example, the output from the model 812 is a probability and therefore has a built-in measure of uncertainty, or "confidence metric." For example, in the case of learned device targeting, the output from the model 812 is a probability of a particular target device identity based on the input data 804 corresponding to the current beaconing session. Similarly, in the case of automatic power management, the output from the model 812 may be a probability that one or more playback devices should enter a power saving ("sleep") mode at a particular time of day/night. In one example, the uncertainty threshold 822 dictates a value at which the uncertainty in the model output is sufficiently low for the MPC 802 to trust the model prediction. For example, if the model output (prediction) is a 60% probability that the target device is the playback device 310*b*, the uncertainty (40% in this case) may be too high for the MPC 802 to trust the model prediction. This may indicate a need for re-training of the model 812, for example. In some examples, the decision threshold 824 dictates a value at which the uncertainty in the model output is sufficiently low for the MPC 802 to take a certain action based on the model output. This action may include providing a personalization suggestion to the user, or even automatically implementing one or more personalization settings (such as activating a predicted target playback device, sending one or more playback devices into a power saving mode, automatically setting or adjusting the volume of a playback session, etc.).

To minimize friction with a user and avoid negative user experiences, the decision threshold may be set at a relatively high value (very low uncertainty) and may be significantly higher than the uncertainty threshold. For example, while a probability of 90% that the target device is playback device 310*b* may be sufficiently low uncertainty to indicate that the model 812 is operating correctly, the uncertainty may still be too high for the MPC 802 to autonomously direct selection of playback device 310*b* as the target device. In this case, the MPC 802 may suggest the target device to the user or take no action with respect to the model prediction.

In some instances, the uncertainty threshold 822 and/or the decision threshold 824 can be hyperparameters that are applied (and optionally tuned) by the optimizer 810. For example, the uncertainty threshold 822 and/or the decision threshold 824 may together define a trust region in which it is likely that acting on the model prediction will not result in undesirable system behavior (e.g., selecting the wrong target device or wrong volume setting) and a negative user experience. In some examples, the optimizer 810 can be constrained to optimize the model parameters within this trust region set by the uncertainty threshold 822 and the decision threshold 824. In other examples, the uncertainty threshold 822 and/or the decision threshold 824 may directly affect the decision behavior of the MPC 802. For example, as described above, in some instances, the MPC 802 can be configured to automatically take an action (such as selecting a target device or implementing a power management schedule) if the uncertainty in the model prediction is below the limit set by the decision threshold (e.g., below 10%, 5%, or 2% uncertainty, etc.). In some examples, the MPC 802 may offer a suggestion of the personalization setting to the user if the uncertainty in the model prediction is below the limit set by the decision threshold 824, or is above the limit set by the decision threshold 824 but below the limit set by the uncertainty threshold 822 (e.g., within the trust region). Various other scenarios will be apparent given the benefit of this disclosure. Thus, the confidence element 820 can provide a valuable resource in terms of configuring the system

800 to provide useful target device recommendations to users and reduce instances of providing incorrect, unwanted, or annoying suggestions or actions.

According to certain examples, the MPC 802 may further acquire and store user preference information, as indicated at 816. The user preferences 816 may include user-provided information regarding the level of personalization desired by the user, playback device attributes or configurations that the user does or does not want to be personalized. For example, a user may agree to automatic target device selection in some scenarios, but not others, or may indicate that while target device suggestions may be provided, automatic target device selection is not permitted. In another example, a user may agree to automatic power management, but not to personalized volume and/or playlist selection settings. The user preferences 816 may thus contain various information regarding particular user preferences with respect to personalization functionalities described herein. The user preferences 816 may be acquired as part of the input data 804 in some examples or may be separately acquired and stored. In some examples, a user may enter the user preferences via a user interface 818, such as the user interface 133 on a control device 130, for example. In some examples, the user preferences 816 can be used to control how the hyperparameters are selected. For example, the optimizer 810 can be configured to optimize the model parameters within constraints set by the user preferences 816. User preferences 816 may also directly influence the behavior of the MPC 802, such as by constraining automated actions to certain time periods, and/or scenarios, or by forbidding automatic action (e.g., automatic target device or playlist selection) and allowing suggestions only. In some examples, the user preferences 816 can be used to set either or both of the decision threshold 824 and/or the uncertainty threshold 822. In this manner, a user can be provided with a wide degree of control over the behavior of the system 800 such that the system 800 can be configured in accord with an individual user's own preferences and comfort level with system autonomy and personalization.

Furthermore, passive user feedback can be used to gauge the accuracy of the model predictions and adjust the model 812 to improve performance. For example, if the system 800 suggests a target device and/or audio source to the user via the user interface 818 and the user selects that target device and/or audio source, the MPC 802 may interpret that the prediction was correct. On the other hand, if the user selects a different target device and/or audio source, the MPC 802 may interpret that the prediction was incorrect. Thus, this passive user feedback can be acquired nearly continuously without bothering the user, since the feedback is acquired through the user's natural interactions with the system, rather than through specific training-related tasks. As described further below, this passive user feedback can be used to label the corresponding features associated with the signal measurement data set that produced the prediction and produce labeled training data. By re-training the model 812 with this labeled training data, the model 812 may produce similar predictions with higher or lower confidence metrics. In some examples, where the labeled training data is based on positive user feedback, the re-trained model 812 may produce a corresponding prediction based on similar input data 804 with a higher confidence metric (e.g., higher probability). In other examples, where the labeled training data is based on negative user feedback, the model may be less likely to produce a corresponding prediction based on similar input data 804, or if it does, may produce the corresponding prediction with a lower confidence metric (e.g., lower probability).

Figure 9:
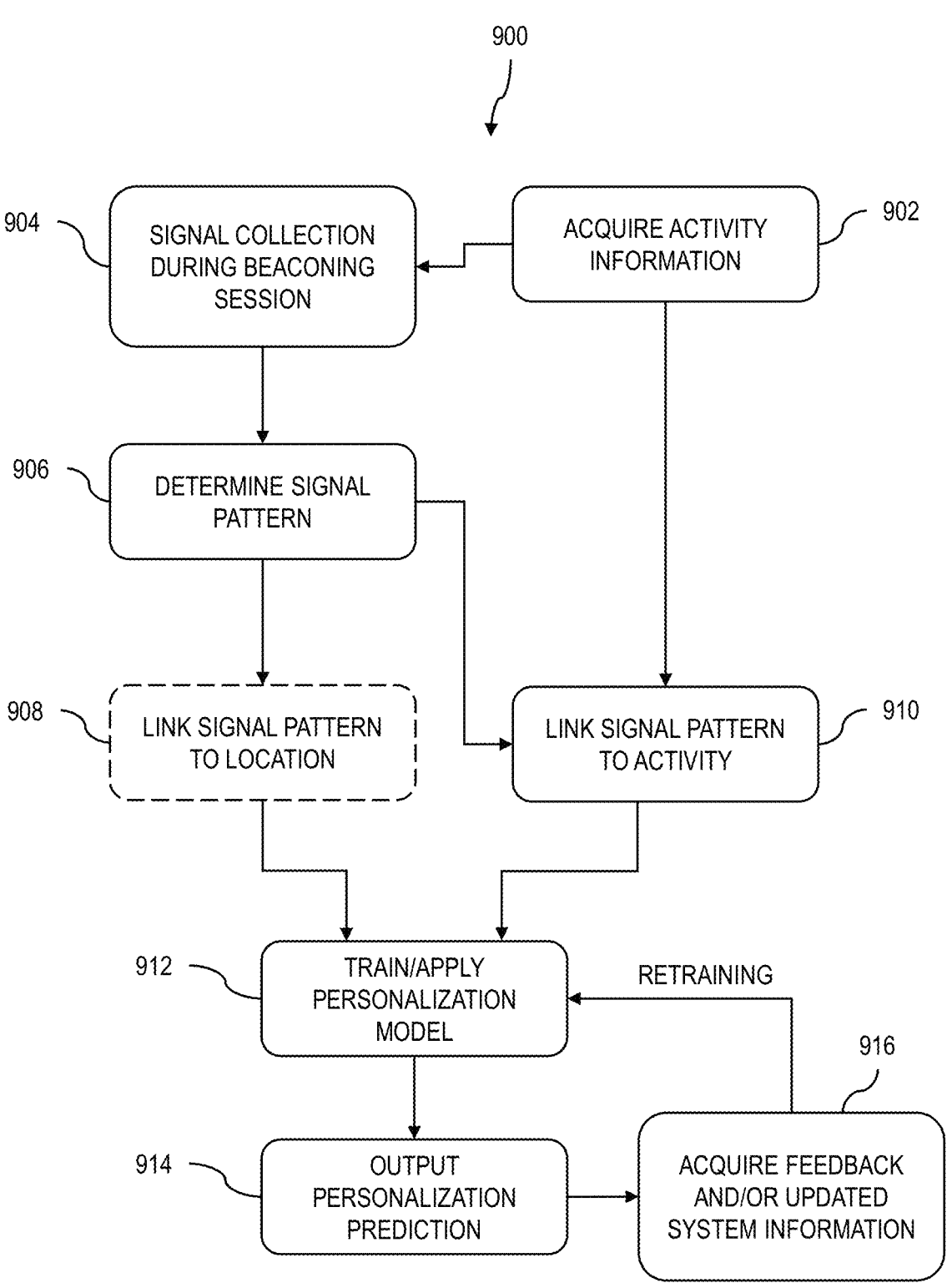
FIG. 9 is a flow diagram of one example of a personalization process according to aspects of the disclosed technology.

FIG. 9 is a flow diagram of one example of a process 900 of applying the system 800 to implement learned personalization in accord with certain aspects of the present disclosure.

At operation 902, the system acquires activity information associated with one or more playback devices. This activity information may include any of a variety of user interactions with the MPS 100. For example, the activity information may include initiation or alteration (e.g., changing an audio source) of a playback session on one or more playback devices, changing a volume setting, adding a particular playback device 310 to a bonded group, etc.

At operation 904, signal collection by the controller 330 and/or one or more playback devices 310 occurs during a beaconing session 426, as described above.

At operation 906, the signal pattern 602 associated with the beaconing session 426, and therefore with the location of the controller 330 during the beaconing session, is produced. As described above, in some examples, at operation 906, the computation device produces the signal pattern 602 from the reporting signals and any signal measurement data acquired during the beaconing session 426 by the computation device itself.

In some examples, at operation 908, the signal pattern 602 produced at operation 906 is linked to a relative location within the environment 300. For example, as described above, a reference pattern acquired through the exchange of reference signals 306 among the playback devices 310 can be used to set a baseline or positioning framework that can be used to link the signal patterns 602 to particular locations relative to one or more playback devices 310 within the environment 300.

At operation 910, the signal pattern acquired at operation 906 can be linked to the activity information acquired at operation 902. As described above, in some instances, a beaconing session 416 is triggered or initiated by a user's interaction with the controller 330, thus indicating to the system that an activity is about to occur. Accordingly, the resulting activity that triggered the start of the beaconing session can be reliably linked to the signal pattern that corresponds to that beaconing session. For example, referring to FIG. 3B, if a user, through interaction with the controller 330 (e.g., via the user interface 133) begins a playback session using a bonded group of playback devices including the playback devices 310d, 310e, and 310f, this activity initiates a beaconing session that allows the signal pattern corresponding to location 1 of the controller 330 in FIG. 3B to be produced. Accordingly, this activity can be linked to the corresponding signal pattern and location 1. The activity information can also include playback device identity information. In the above example, the playback devices 301d, 310e, and 310f can be identified as the target devices for the activity. Similarly, referring to FIG. 3C, if a user, through interaction with the controller 330, begins a playback session on the playback device 310h, this activity, and the identity of the playback device 310h, can be associated with the signal pattern corresponding to location 2 of the controller 330 in FIG. 3C.

As described above, the signal pattern and the associated activity information can be used as input data 804 for the MPC 802. In certain examples, the computation device can collect and store the input data 804, for example, in a matrix or other data structure in a memory that is part of the computation device, as described above. Thus, in some examples, the MPC 802 is operated on the computation device; however, in other examples, the MPC 802 can be operated on one or more other network devices in the MPS 100. At operation 912, the input data 804 can be used both to train (or re-train) the model 812 and by the model 812 to predict a particular personalization setting. In some examples, at operation 912, the data sampler 814 extracts one or more features from the input data 804. In some examples, the beacon signal measurements (e.g., RSSI values, signal data sets 606, etc.) can be used as model features, while the activity information can be used as labels for the corresponding signal pattern data. Accordingly, at operation 912, these inputs can be used to train, and then once trained, apply, one or more personalization models to predict personalization settings based on recognizing signal patterns produced during future beaconing sessions.

Figure 10:
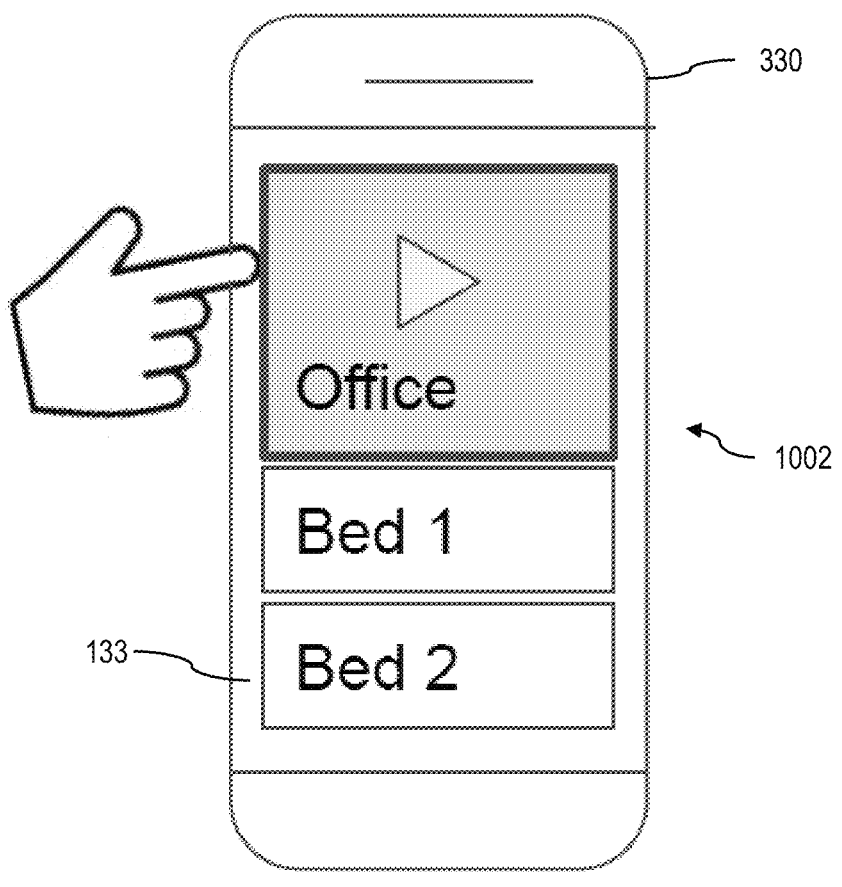
FIG. 10 is a diagram of one example of a controller according to aspects of the disclosed technology.

At operation 914, based on the input data 804, the trained model outputs one or more personalization setting predictions. Based on the user preferences 816, the confidence element 820, and the certainty associated with the model prediction, at operation 914, the MPC 802 may act on the prediction. For example, provided that the personalization prediction produced by the model 812 exceeds the uncertainty threshold 822 (and optionally the decision threshold 824), a predicted personalization setting can be offered/suggested to the user via the user interface 133 of the controller 330. For example, referring to FIG. 10, in the case of the personalization setting being a predicted target device, offering the suggestion to the user may be accomplished by displaying the predicted target device first in a list 1002 of available playback devices 310 that could be potential target devices, and/or by highlighting or otherwise emphasizing the predicted target device such that the user may be drawn to that selection. Similarly, in the case of the personalization setting being a predicted audio source, offering the suggestion to the user may be accomplished by displaying the predicted audio source first in a list 1002 of available audio sources, and/or by highlighting or otherwise emphasizing the predicted audio source such that the user may be drawn to that selection. In other examples, if the user preferences 816 permit and the certainty/confidence metric is sufficiently high, at operation 914, the MPC 802 may cause the predicted personalization setting to be automatically applied, as described above.

As also described above, in certain examples, the MPC 802 can be configured such that a recommended personalization setting is only offered to the user if the uncertainty associated with the prediction falls within the "trust region" defined by the confidence element 820. Similarly, the level of intrusiveness (e.g., from no action, to a recommendation, to automatic selection) with which the MPC 802 presents a recommended target device may vary based on the confidence metric and the user preferences 816, as described above. Thus, the system can be configured to provide an adaptive, user-driven experience that can be tailored to individual users and/or environments and accommodate changes, in the environment and/or user routines or preferences, over time.

At operation 916, the system 800 may acquire feedback associated with the personalization prediction offered or implemented at operation 914. For example, the user may, through the user interface 133, confirm or reject a personalization setting offered by the system. In some instances, this passive user feedback can be used to label the data that produced the prediction. For example, referring again to FIG. 10, if the user selects the suggested target device, a "correct" label can be applied, whereas if the user selects a different playback device from the list (indicating that the prediction was incorrect), an "incorrect" label can be applied. In some examples, the screen displaying the list 1002 with the highlighted suggested personalization setting may "time out" after a certain period of user inactivity. In such instances, the system can interpret this as confirmation of the selection by the user. Thus, the predicted personalization setting can be implemented and a correct label applied. In this manner, the linking of signal patterns for various locations of the controller 330 to particular target devices and/or activities at operation 910 can be reinforced or corrected, and the labeled data can be used to re-train the model 812 such that the model learns to predict personalization settings for similar signal patterns with greater and greater accuracy (higher associated probabilities).

Figure 11:
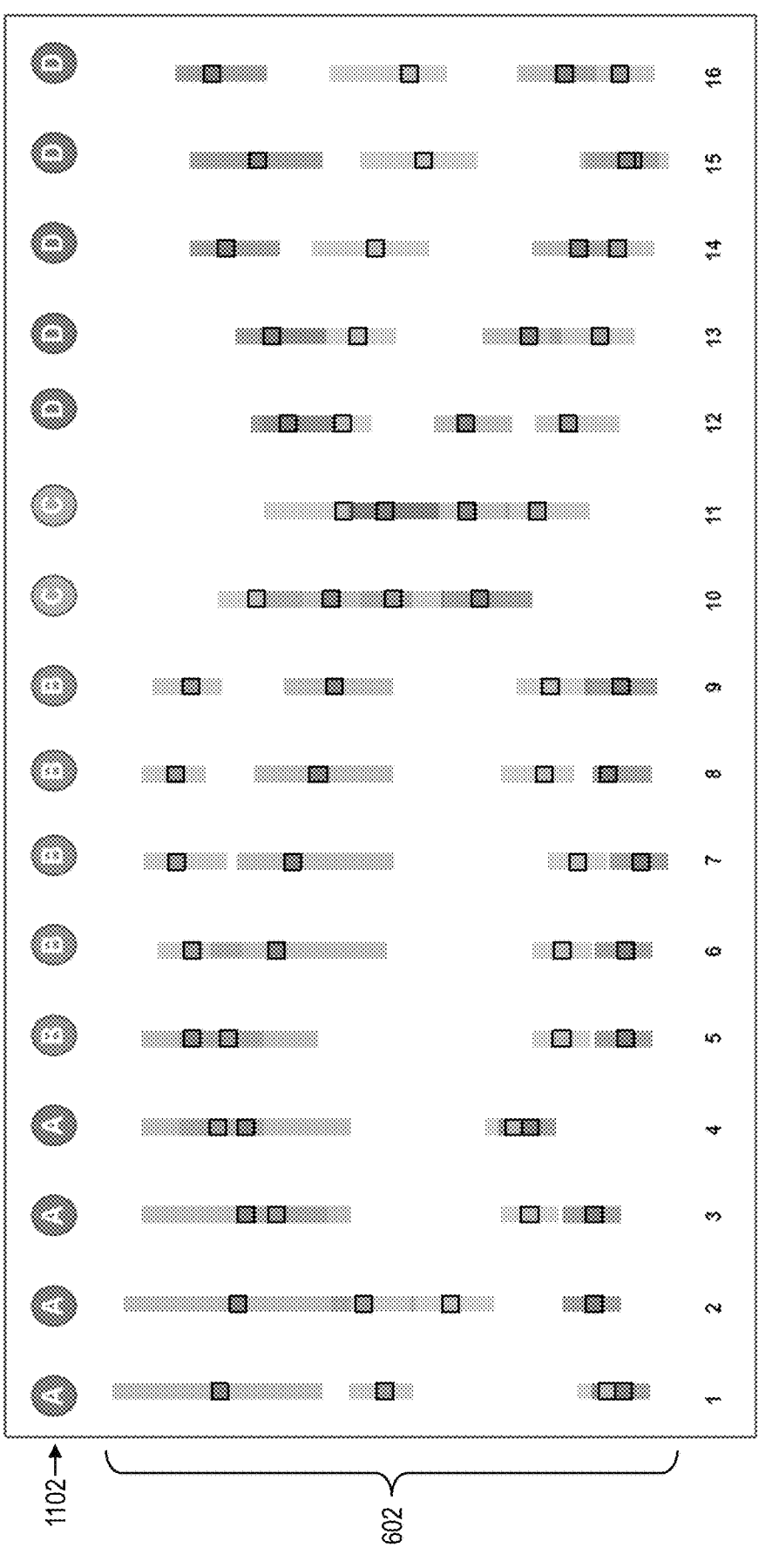
FIG. 11 is a graph showing an example of labeled signal patterns according to aspects of the disclosed technology.

FIG. 11 illustrates an example of the signal patterns of FIG. 7B labeled with respective labels 1102. As described above, the labels can include activity information and/or target device identities that may be acquired at operation 902 and/or via user feedback acquired at operation 916. In the example illustrated in FIG. 11, the labels 1102 include target device identities; however, as noted above, a wide variety of other information can be contained in the labels 1102. In some examples, the labeled signal patterns can be stored by the computation device and/or one or more other network devices in the MPS 100. Accordingly, at operation 912, the model 812 can be trained using the labeled data to produce an updated model that can be used for future iterations of the process 900. In this manner, the system can apply continued learning to gather new training data over time and improve prediction accuracy as the amount of local labeled input data 806 increases with user interactions with the MPS 100.

As described above, in some instances, changes in the reference pattern produced from the exchange of reference signals 306 can indicate a significant change in the environment 300, such as movement of one or more playback devices 310 and/or the addition of a new playback device. Such a change may impact the validity or usefulness of previously stored labeled data. For example, referring to FIGS. 7A and 7C, movement of the playback device 310a from the office 301c to the master bedroom 301a may alter personalized grouping and/or targeting settings associated with the playback devices 310a and/or 310b. This may also affect the validity of labels associated with signal patterns 602 for various locations, particularly in the office 301c and/or the master bedroom 301a. Accordingly, in some examples, at operation 916, the system may acquire information that indicates such a change or update to the arrangement of the MPS 100 within the environment 300. This updated system arrangement information may be acquired through recognition of a change in the reference pattern or in another manner (e.g., movement detected by a portable playback device, user inputs provided via the controller 300 to indicate a change or addition of a playback device, etc.).

In some examples, recognition of a change in the reference pattern can trigger the system 800 to discard some or all previously stored labeled data and cause the model 812 to undergo re-training at operation 912 to adapt to the new configuration of the environment 300. In certain examples, the system 800 can be configured to evaluate reference patterns according to a "change threshold," such that if the difference between one instance of the reference pattern and another exceeds the change threshold, the system 800 may trigger retraining. This may allow the system to account for small variations in the reference pattern that may naturally occur due to differences in environmental conditions, even when no playback devices 310 have in fact moved or moved significantly.

As described above, in some instances, the system can be configured to produce anchor reference patterns using only stationary playback devices 310 in the MPS 100. In some examples, if an anchor reference pattern changes, this may trigger a complete retraining of the model 812 at operation 912. In other examples, a portable playback device may have contributed to the reference pattern, but may not be an anchor device, such that its movement alters the reference pattern but not the anchor reference pattern. In such cases, changes in the reference pattern, due to movement of the portable playback device, may trigger the system 800 to re-train the model 812 only with respect to labeled data that involved the portable playback device. In this manner, the system may seamlessly adapt to changes in the environment 300 while minimizing the likelihood that such changes result in incorrect personalization that could cause a negative user experience.

Figure 12:
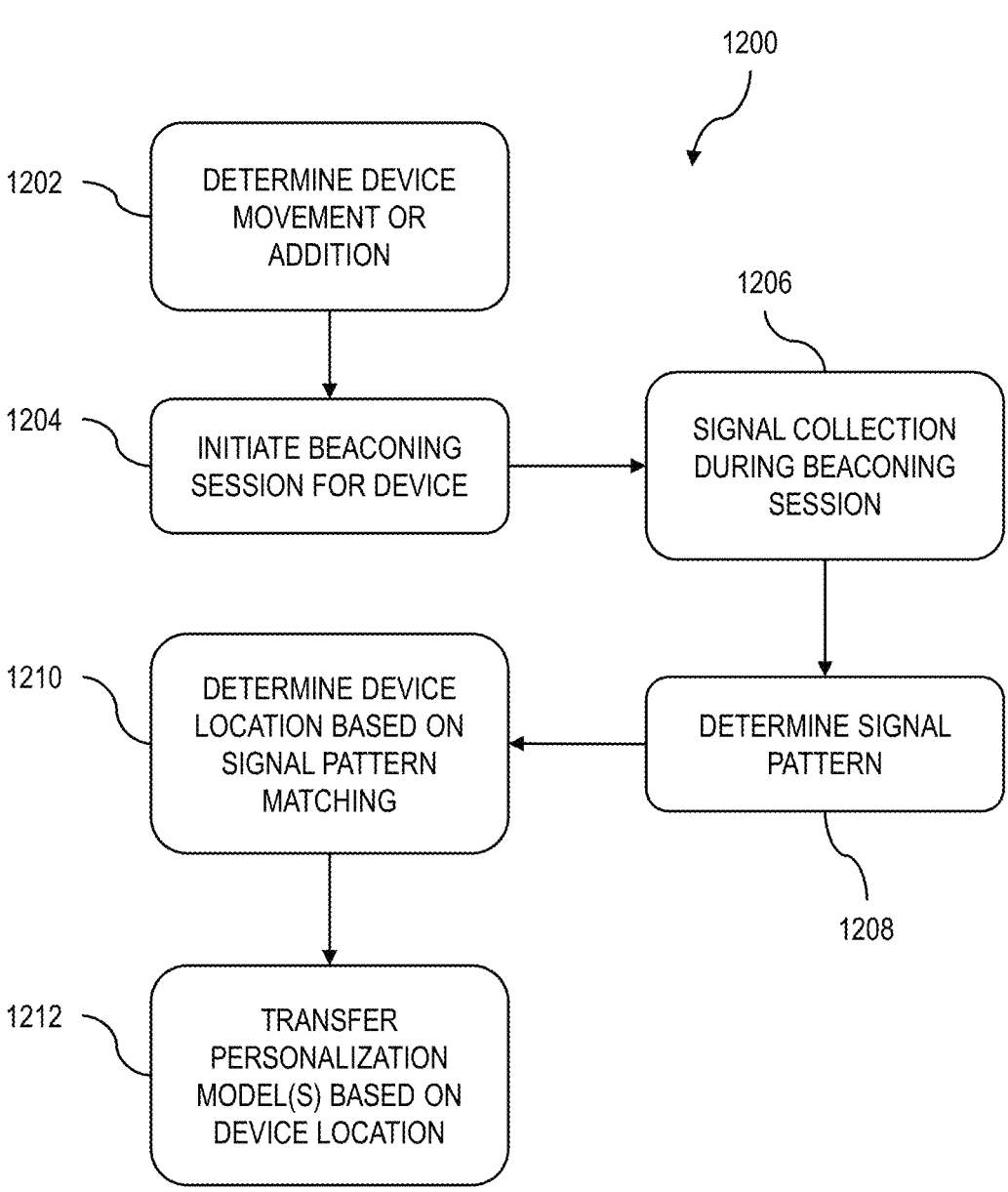
FIG. 12 is a flow diagram of one example of a method of personalization model transfer according to aspects of the disclosed technology.

Furthermore, to minimize the need for model re-training that may be associated with movement of a playback device 310, according to certain examples, personalization settings can be transferred from one device to another based on device location. For example, referring again to FIGS. 7A and 7C, based on detecting movement of the playback device 310a to location 7, previously-determined personalization settings associated with location 7 can be transferred to the playback device 310a so as to avoid the need to completely re-train the model 812 based on the new location of the playback device 310a. FIG. 12 illustrates a flow diagram of an example of a personalization model transfer process 1200 according to certain embodiments.

Referring to FIG. 12, at operation 1202, it is determined that a playback device 310 has moved from one location within the environment to another (e.g., movement of the playback device 310a illustrated in FIGS. 7A and 7C), or that a new playback device has been added to the MPS 100. In some examples, this movement or addition can be determined by detecting changes in the reference patterns produced using exchange of reference signals 306 among the playback devices 310, as described above. In other examples, this movement or addition can be determined through in-room presence detection of the new/moved device. In another example, a portable playback device may detect its own movement and/or acquire positioning/localization information data that indicates its movement, as discussed above with reference to FIG. 2. Various other mechanisms for detecting the movement and/or addition of one or more playback devices 310 at operation 1202 may also be employed.

At operation 1204, a beaconing session is initiated for the moved/new playback device. The beaconing session may be initiated by the moved/new playback device 310, or by another device in the MPS 100 based on the presence/movement detected at operation 1202.

At operation 1206, a beaconing session is conducted for the new/moved playback device 310. As described above with reference to FIGS. 7A-C, this beaconing session may be performed in the same manner as described with reference to FIG. 4 (operations 406-412); however, the new/moved playback device 310 performs the role of the controller 330 in the beaconing session 426. For example, the moved/new playback device 310 may detect one or more beacon signals 304 from other playback devices 310 and acquire signal measurements therefrom, as described above. In some examples, the new/moved playback device 310 also transmits beacon signals 304 for detection by other playback devices 310, and the combined signal measurements can be used to produce a signal pattern, as described above.

At operation 1208, a signal pattern corresponding to the location of the new/moved playback device 310 in the environment 300 is produced based on the signal measurements collected at operation 1206.

At operation 1210, the signal pattern produced at operation 1208 can be compared with previously acquired signal patterns to localize the new/moved playback device 310. For example, referring again to FIGS. 7A-C, in this instance, the playback device 310a has moved to a location proximate to location 7 for which a signal pattern has been acquired (as shown in FIG. 7B). Accordingly, based on similarity (within some predetermined thresholds/tolerance) between the signal pattern acquired for the playback device 310a at operation 1206 and the signal pattern previously associated with location 7, it may be determined that the playback device 310a is now at or near location 7.

Figure 13:
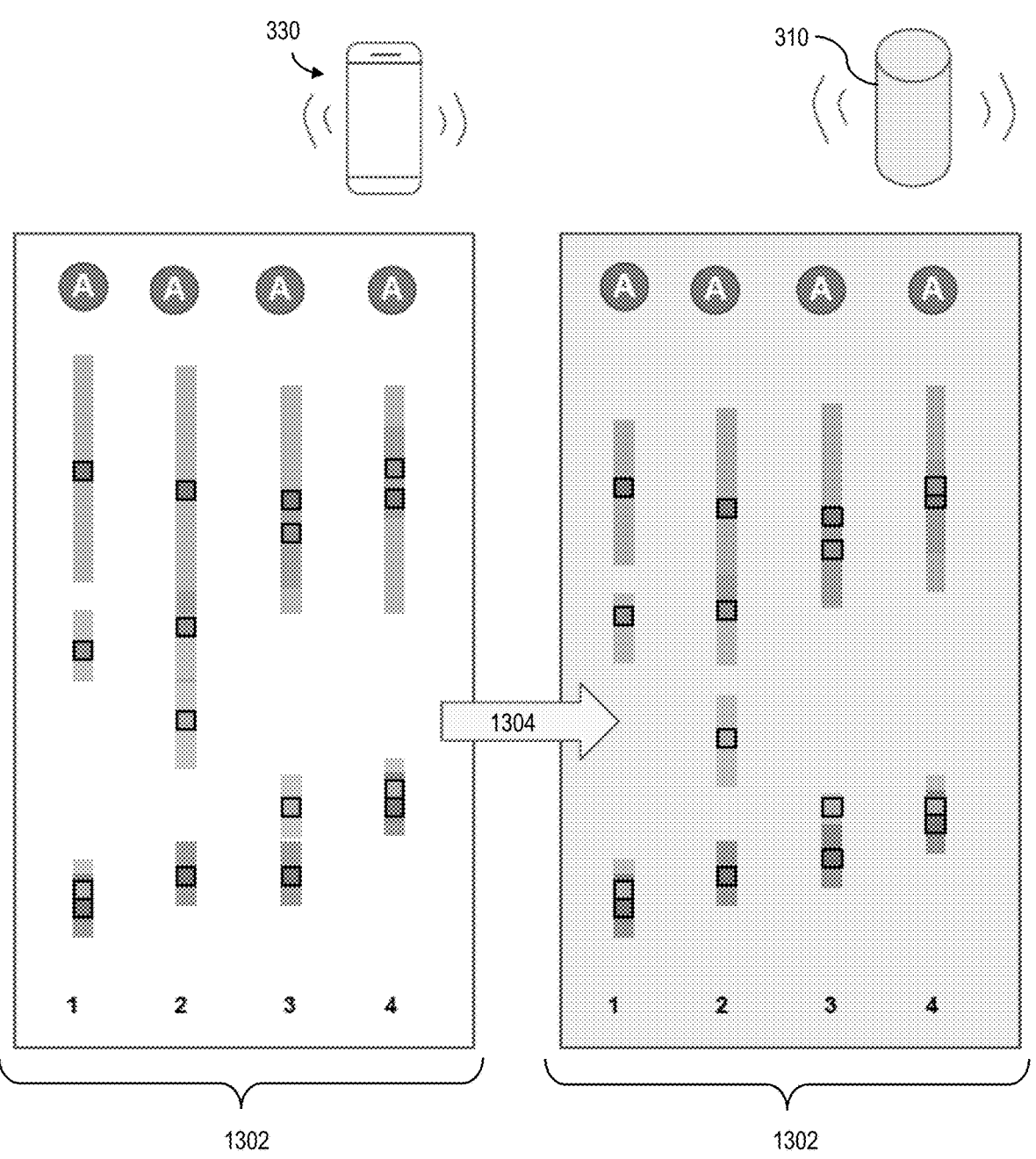
FIG. 13 is a diagram illustrating an example of personalization model transfer according to aspects of the disclosed technology.

Accordingly, at operation 1212, personalization settings that may have been determined and associated with location 7 can be transferred to the playback device 310a. In one example, this transfer can include transferring a trained model 812 to an MPC 802 operating on the new/moved playback device 310, the trained model having been trained with personalization settings associated with the location of the new/moved playback device. In other examples, the transfer may include transferring labeled input data 804 associated with the determined location. For example, FIG. 13 illustrates transfer (indicated by arrow 1304) of a labeled signal data set 1302 previously acquired using the controller 330 to a playback device 310. In some examples, the transfer may be requested by the new/moved playback device 310.

Based on the transfer performed at operation 1212, the new/moved playback device 310 can acquire personalization settings associated with its new location without the system 800 having to perform complete training/re-training of the model 812. By leveraging the information already acquired and associated with the location, the new/moved playback device 310 can be ready to apply accurate personalization settings more quickly and seamlessly. This also allows the MPS 100 to more easily integrate a new playback device and maintain the level of personalization established prior to addition of the new playback device. These attributes may enhance user experience and enjoyment with their MPS 100.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular element, structure, or characteristic described in connection with the embodiment can be included in at least one example embodiment disclosed herein. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VI. Additional Examples

The following examples pertain to further embodiments, from which numerous permutations and configurations will be apparent.

Example 1 provides a method comprising, during a plurality of beaconing sessions, collecting, with a network device positioned at a plurality of locations, information indicative of a plurality of patterns of wireless signals between the network device and a plurality of playback devices, with the network device, training a first parameterized machine learning model to produce a trained model that identifies one or more playback devices proximal to the network device based on one or more features derived from the information, transferring the trained model to a portable playback device, during a subsequent beaconing session, collecting, with the portable playback device, data indicative of a pattern of wireless signals between the portable playback device and the plurality of playback devices, with the portable playback device, applying the trained model to at least one feature derived from the data to identify at least one playback device of the plurality of playback devices that is proximal to the portable playback device, and with the portable playback device, communicating at least one request to the at least one playback device.

Example 2 includes the method of Example 1, further comprising, during the plurality of beaconing sessions, collecting, with the network device, one or more reporting signals containing information indicative of patterns of beacon signals between each of the plurality of playback devices and the network device.

Example 3 includes the method of one of Examples 1 or 2, wherein applying the trained model comprises using the trained model to determine whether that the at least one playback device is a bonding target for the portable playback device, and providing a recommendation to form a bonded group comprising the portable playback device and the at least one playback device.

Example 4 includes the method of Example 3, further comprising detecting user feedback regarding the recommendation, and retraining the trained model based on the user feedback.

Example 5 includes the method of any one of Examples 1-4, method of claim 1, further comprising using the trained model to predict a bonding target playback device for the portable playback device based on the second location, and automatically forming a bonded group comprising the portable playback device and the bonding target playback device.

Example 6 includes the method of any one of Examples 1-5, wherein collecting the data indicative of a pattern of wireless signals between the portable playback device and the plurality of playback devices comprises collecting received signal strength indicator (RSSI) values of the wireless signals and a count of the wireless signals.

Example 7 provides a playback device comprising a wireless communication interface configured to support communication of data via at least one network protocol, at least one processor, and at least one non-transitory computer readable medium storing program instructions that are executable by the at least one processor to cause the playback device to detect, via the wireless communication interface, information indicative of a pattern of wireless signals between the playback device and a plurality of other playback devices, detect, via the wireless communication interface, information from an external device correlating a baseline pattern of wireless signals with a location, compare the pattern of wireless signals with the baseline pattern, and based on a level of similarity between the pattern of wireless signals and the baseline pattern transgressing a predetermined threshold value, infer that a position of the playback device corresponds to the location.

Example 8 includes the playback device of Example 7, wherein the playback device is a portable playback device.

Example 9 includes the playback device of one of Examples 7 and 8, wherein the baseline pattern is determined by a network device by, during one or more beaconing sessions, collecting, with the network device positioned at one or more locations, information indicative of one or more patterns of wireless signals between the network device and the plurality of other playback devices.

Example 10 includes the playback device of any one of Examples 7-9, wherein the at least one non-transitory computer readable medium further stores program instructions that are executable by the at least one processor to cause the playback device to, based on inferring that the position of the playback device corresponds to the location, apply one or more personalization settings selected from a plurality of personalization settings.

Example 11 includes the playback device of Example 10, wherein the plurality of personalization settings includes volume settings, a power management schedule, and a grouping status of the playback device with one or more other playback devices of the plurality of other playback devices.

Example 12 includes the playback device of any one of Examples 7-11, wherein the at least one non-transitory computer readable medium further stores program instructions that are executable by the at least one processor to cause the playback device to, based on inferring that the position of the playback device corresponds to the location, identify a proposed target playback device for receiving an instruction from the playback device.

Example 13 includes the playback device of Example 12, wherein the instruction is an instruction to form a bonded group comprising the playback device and the proposed target playback device.

Example 14 includes the playback device of Example 12, wherein the instruction is an instruction to begin playback of audio content.

Example 15 includes the playback device of any one of Examples 7-14, wherein to detect the information indicative of the pattern of wireless signals, the at least one non-transitory computer readable medium stores program instructions that are executable by the at least one processor to cause the playback device to detect a plurality of beacon signals emitted by the plurality of other playback devices.

Example 16 includes the playback device of claim 15, wherein to detect the information indicative of the pattern of wireless signals, the at least one non-transitory computer readable medium further stores program instructions that are executable by the at least one processor to cause the playback device to determine, for each beacon signal, a received signal strength indicator (RSSI) value and a standard deviation of a signal strength of the detected beacon signal relative to a median signal strength of the plurality of beacon signals, and determine a first count of the plurality of beacon signals detected during a predetermined collection time period.

Example 17 includes the playback device of Example 16, wherein the at least one tangible non-transitory computer readable medium further stores program instructions that are executable by the at least one processor to cause the playback device to transmit, via the wireless communication interface, a beacon signal.

Example 18 includes the playback device of one of Examples 16 or 17, wherein each of the plurality of beacon signals includes a sequence of tones and a transmission identifier.

Example 19 includes the playback device of Example 18, wherein at least one of the sequence of tones or the transmission identifier identifies a playback device that is a source of the respective beacon signal.

Example 20 includes the playback device of any one of Examples 7-19, wherein the at least one network protocol includes a BLUETOOTH LOW ENERGY protocol.

Example 21 provides a playback device comprising a wireless communication interface configured to support communication of data via at least one network protocol, at least one processor, and at least one non-transitory computer readable medium storing program instructions that are executable by the at least one processor to cause the playback device to detect, via the wireless communication interface, a plurality of beacon signals emitted by a plurality of other playback devices, based on the plurality of beacon signals, determine a pattern of wireless signals between the playback device and the plurality of other playback devices, detect, via the wireless communication interface, information containing one or more location-based personalization settings, based on the pattern of wireless signals, infer a location of the playback device, and use the location of the playback device and at least one of the one or more location-based personalization settings to train a parameterized machine learning model to predict a setting of the playback device.

Example 22 includes the playback device of Example 21, wherein the playback device is a portable playback device.

Example 23 includes the playback device of one of Examples 21 or 22, wherein the one or more location-based personalization settings include one or more of a volume setting, a power management schedule, or a grouping status.

Example 24 includes the playback device of Example 23, wherein the setting of the playback device includes one or more of the volume setting, the power-management schedule, or the grouping status.

Example 25 includes the playback device of any one of Examples 21-24, wherein the parameterized machine learning model includes one of a logistic regression model or a Gaussian Process model.

Example 26 includes the playback device of any one of Examples 21-25, wherein the at least one network protocol includes a BLUETOOTH LOW ENERGY protocol.

Example 27 includes the playback device of any one of Examples 21-26, wherein to determine the pattern of wireless signals, the at least one non-transitory computer readable medium further stores program instructions that are executable by the at least one processor to cause the playback device to determine, for each beacon signal, a received signal strength indicator (RSSI) value and a standard deviation of a signal strength of the detected beacon signal relative to a median signal strength of the plurality of beacon signals, and determine a first count of the plurality of beacon signals detected during a predetermined collection time period.

Example 28 provides an audio playback system comprising a plurality of playback devices, and a controller comprising a user interface, a first wireless communication interface, and a memory storing an association between a first location and a particular playback device of the plurality of playback devices. The controller is configured to detect, via the user interface, user input requesting interaction with the audio playback system, acquire, via the first wireless communication interface, a first pattern of a plurality of signals generated by the plurality of playback devices, detect, via the user interface, user input instructing the particular playback device to execute an audio command, and associate, based on detection of the user input, the first pattern with the first location. The audio playback system further comprises a portable playback device comprising a second wireless communication interface and configured to determine that a location of the portable playback device is unknown, request, via the second wireless communication interface, one or more wireless signal patterns from the controller, receive, via the second wireless communication interface, the first pattern from the controller, detect, via the second wireless interface, a second pattern of a plurality of signals generated by the plurality of playback devices, compare the second pattern to the first pattern, and determine that the location of the portable playback device corresponds to the first location based on a similarity between the first pattern and the second pattern.

Example 29 provides an audio playback system comprising a plurality of playback devices, a controller comprising a user interface, a first wireless communication interface, and a memory storing an association between a first location and a particular playback device of the plurality of playback devices. The controller is configured to acquire over time, via the first wireless communication interface, a plurality of beacon signals from the plurality of playback devices, and based on the plurality of beacon signals, determine a plurality of patterns of wireless signals between the controller and the plurality of other playback devices, each pattern of wireless signals corresponding to a particular location of the controller. The audio playback system further comprises a portable playback device comprising a second wireless communication interface and configured to request, via the second wireless communication interface, one or more of the plurality of patterns of wireless signals from the controller, receive, via the second wireless communication interface, the one or more of the patterns of wireless signals from the controller, detect, via the second wireless interface, a second pattern of a plurality of wireless signals generated by the plurality of playback devices, compare the second pattern to at least one of the one or more patterns of wireless signals, and derive a location of the portable playback device based on a similarity between the second pattern and at least one of the one or more patterns of wireless signals.

The invention claimed is:

1. A method comprising:

during a plurality of beaconing sessions, collecting, with a network device positioned at a plurality of different locations during the plurality of beaconing sessions, information indicative of a plurality of patterns of wireless signals between the network device and a plurality of playback devices;

with the network device, training a first parameterized machine learning model to produce a trained model that identifies one or more playback devices proximal to the network device based on one or more features derived from the information;

transferring the trained model from the network device to a portable playback device;

during a subsequent beaconing session, collecting, with the portable playback device, data indicative of a pattern of wireless signals between the portable playback device and the plurality of playback devices;

with the portable playback device, applying the trained model to at least one feature derived from the data to identify at least one playback device of the plurality of playback devices that is proximal to the portable playback device; and with the portable playback device, communicating at least one request to the at least one playback device.

2. The method of claim 1, further comprising:

during the plurality of beaconing sessions, collecting, with the network device, one or more reporting signals containing information indicative of patterns of beacon signals between each of the plurality of playback devices and the network device.

3. The method of claim 1, wherein applying the trained model comprises:

using the trained model to determine whether that the at least one playback device is a bonding target for the portable playback device; and providing a recommendation to form a bonded group comprising the portable playback device and the at least one playback device.

4. The method of claim 3, further comprising:

detecting user feedback regarding the recommendation; and retraining the trained model based on the user feedback.

5. The method of claim 1, further comprising:

using the trained model to predict that the at least one playback device is a bonding target for the portable playback device based; and automatically forming a bonded group comprising the portable playback device and the at least one playback device.

6. The method of claim 1, wherein collecting the data indicative of a pattern of wireless signals between the portable playback device and the plurality of playback devices comprises collecting received signal strength indicator (RSSI) values of the wireless signals and a count of the wireless signals.

7. A portable playback device comprising:

a wireless communication interface configured to support communication of data via at least one network protocol;

at least one processor; and at least one non-transitory computer readable medium storing program instructions that are executable by the at least one processor to cause the portable playback device to initiate a beaconing session based on determining that a position of the portable playback device is unknown, detect, via the wireless communication interface and during the beaconing session, information indicative of a pattern of wireless signals between the portable playback device and a plurality of other playback devices, detect, via the wireless communication interface, information from an external device correlating a baseline pattern of wireless signals with a location, compare the pattern of wireless signals with the baseline pattern, and based on a level of similarity between the pattern of wireless signals and the baseline pattern transgressing a predetermined threshold value, infer that the position of the portable playback device corresponds to the location.

8. The portable playback device of claim 7, wherein the baseline pattern is determined by a network device by, during one or more beaconing sessions, collecting, with the network device positioned at a plurality of locations during the one or more beaconing sessions, information indicative of a plurality of patterns of wireless signals between the network device and the plurality of other playback devices, each pattern of the plurality of patterns of wireless signals corresponding to a respective location of the plurality of locations of the network device.

9. The portable playback device of claim 7, wherein the at least one non-transitory computer readable medium further stores program instructions that are executable by the at least one processor to cause the portable playback device to:

based on inferring that the position of the portable playback device corresponds to the location, apply one or more personalization settings selected from a plurality of personalization settings.

10. The portable playback device of claim 9, wherein the plurality of personalization settings includes volume settings, a power management schedule, and a grouping status of the portable playback device with one or more other playback devices of the plurality of other playback devices.

11. The portable playback device of claim 7, wherein the at least one non-transitory computer readable medium further stores program instructions that are executable by the at least one processor to cause the portable playback device to:

based on inferring that the position of the portable playback device corresponds to the location, identify a proposed target playback device for receiving an instruction from the portable playback device.

12. The portable playback device of claim 11, wherein the instruction is one of (i) an instruction to form a bonded group comprising the portable playback device and the proposed target playback device, or (ii) an instruction to begin playback of audio content.

13. The portable playback device of claim 7, wherein to detect the information indicative of the pattern of wireless signals, the at least one non-transitory computer readable medium stores program instructions that are executable by the at least one processor to cause the portable playback device to:

detect a plurality of beacon signals emitted by the plurality of other playback devices.

14. The portable playback device of claim 13, wherein to detect the information indicative of the pattern of wireless signals, the at least one non-transitory computer readable medium further stores program instructions that are executable by the at least one processor to cause the portable playback device to:

determine, for each beacon signal, a received signal strength indicator (RSSI) value and a standard deviation of a signal strength of the detected beacon signal relative to a median signal strength of the plurality of beacon signals; and determine a first count of the plurality of beacon signals detected during a predetermined collection time period.

15. The portable playback device of claim 14, wherein the at least one tangible non-transitory computer readable medium further stores program instructions that are executable by the at least one processor to cause the portable playback device to:

transmit, via the wireless communication interface, a beacon signal.

16. The portable playback device of claim 14, wherein each of the plurality of beacon signals includes a sequence of tones and a transmission identifier; and wherein at least one of the sequence of tones or the transmission identifier identifies a playback device that is a source of the respective beacon signal.

17. A portable playback device comprising:

a wireless communication interface configured to support communication of data via at least one network protocol;

at least one processor; and at least one non-transitory computer readable medium storing program instructions that are executable by the at least one processor to cause the portable playback device to detect, via the wireless communication interface, a plurality of beacon signals emitted by a plurality of other playback devices, determine characteristics for each beacon signal of the plurality of beacon signals, the characteristics including a received signal strength indicator (RSSI) value and a standard deviation of a signal strength of the beacon signal relative to a median signal strength of the plurality of beacon signals, determine a count of the plurality of beacon signals detected during a predetermined collection time period, based on the characteristics of the plurality of beacon signals and the count, determine a pattern of wireless signals between the portable playback device and the plurality of other playback devices, detect, via the wireless communication interface, information containing one or more location-based personalization settings, based on the pattern of wireless signals, infer a location of the portable playback device, and use the location of the portable playback device and at least one of the one or more location-based personalization settings to train a parameterized machine learning model to predict a setting of the portable playback device.

18. The portable playback device of claim 17, wherein the one or more location-based personalization settings include one or more of a volume setting, a power management schedule, or a grouping status; and wherein the setting of the portable playback device includes one or more of the volume setting, the power-management schedule, or the grouping status.

19. The portable playback device of claim 17, wherein the parameterized machine learning model includes one of a logistic regression model or a Gaussian Process model.

*    *    *    *    *